(12) United States Patent
Zhang

(10) Patent No.: US 12,539,273 B2
(45) Date of Patent: Feb. 3, 2026

(54) EXTERNAL NANO LINIMENT FOR GOUT AND PREPARATION METHOD THEREOF

(71) Applicant: Boke Zhang, Canton, MA (US)

(72) Inventor: Boke Zhang, Canton, MA (US)

(73) Assignee: Boke Zhang, Canton, MA (US)

( * ) Notice: Subject to any disclaimer, the term of this patent is extended or adjusted under 35 U.S.C. 154(b) by 491 days.

(21) Appl. No.: 17/921,356

(22) PCT Filed: Sep. 22, 2021

(86) PCT No.: PCT/CN2021/119582
§ 371 (c)(1),
(2) Date: Oct. 26, 2022

(87) PCT Pub. No.: WO2023/044603
PCT Pub. Date: Mar. 30, 2023

(65) Prior Publication Data
US 2024/0382423 A1 Nov. 21, 2024

(51) Int. Cl.
| | | |
|---|---|---|
| A61K 9/113 | (2006.01) | |
| A61K 9/06 | (2006.01) | |
| A61K 31/7034 | (2006.01) | |
| A61K 47/32 | (2006.01) | |
| A61K 47/44 | (2017.01) | |
| A61P 19/06 | (2006.01) | |

(52) U.S. Cl.
CPC ............... *A61K 9/113* (2013.01); *A61K 9/06* (2013.01); *A61K 31/7034* (2013.01); *A61K 47/32* (2013.01); *A61K 47/44* (2013.01); *A61P 19/06* (2018.01)

(58) Field of Classification Search
None
See application file for complete search history.

(56) References Cited

U.S. PATENT DOCUMENTS

2008/0299200 A1  12/2008  Leser et al.

FOREIGN PATENT DOCUMENTS

| CN | 101972229 | | 2/2011 | |
|---|---|---|---|---|
| CN | 102626390 | | 8/2012 | |
| CN | 102949347 | | 3/2013 | |
| CN | 105283173 | * | 7/2018 | ........... A61K 8/4946 |

OTHER PUBLICATIONS

Tien-Tsai Cheng et al., A Single-bling, randomized, controlled trial to assess the efficacy and tolerability of rofecoxib, diclofenac sodium and meloxicam in patients with acute gouty arthritis, 2004, Clinical Therapeutics, Bol. 26, No. 3 (Year: 2004).*
"International Search Report (Form PCT/ISA/210) of PCT/CN2021/119582," mailed on Jun. 22, 2022, pp. 1-5.
Du Guan-Fneg et al., "Advances in transdermal drug delivery system of the effective components on analgesia," Anhui Medical and Pharmaceutical Journal, Jan. 2015, pp. 1-4.

* cited by examiner

*Primary Examiner* — Nannette Holloman
(74) *Attorney, Agent, or Firm* — ANOVA LAW GROUP, PLLC

(57) ABSTRACT

An external nano liniment for gout and a preparation method thereof are provided. The external nano liniment for gout includes a cream phase and nanoparticles dispersed in the cream phase, wherein the nanoparticles are a coating structure having a water phase, an oil phase and a water phase in sequence from inside to outside, an active ingredient used for treating gout is embedded or dispersed in the water phase and/or the oil phase of the nanoparticles, and a size distribution of the nanoparticles is in a range of 1-200 nm.

10 Claims, 14 Drawing Sheets

Change diagram of uric acid values of Case 3

EXTERNAL NANO LINIMENT FOR GOUT AND PREPARATION METHOD THEREOF

CROSS-REFERENCE TO RELATED APPLICATION

This application is a 371 of international application of PCT application serial no. PCT/CN2021/119582, filed on Sep. 22, 2021. The entirety of the above mentioned patent applications is hereby incorporated by reference herein and made a part of this specification.

TECHNICAL FIELD

The present disclosure relates to a field of biomedicine, and particularly relates to an external nano liniment for gout and a preparation method thereof.

DESCRIPTION OF RELATED ART

Gout is a disease caused by that the deposition of urate on joints due to purine metabolism disorders in a human body results in joint redness, swelling, hotness and pain. It is the second critical metabolic disease after diabetes. Patients with gout jokingly call it "cancer that does not kill". Gout has become the common frequently-occurring disease harmful to human health. The main harm to people is lumps (commonly known as tophi or gout crystals) in bone joints of the whole body, especially in foot and hand joints. The patients are experiencing intolerable pain, "cannot die and cannot live well", and severe cases can result in joint malformation, deformities, paralysis, gouty kidney stones, renal failure and uremia etc. Gout can also be complicated by obesity, hypertension, diabetes, dyslipidemia and other metabolic diseases.

Gout occurs all over the world. The incidence rate in men is 20 times that in women, and it is much higher in coastal areas than inland areas. The global incidence rate of gout is 0.5%. The latest epidemiological statistic data shows that the incidence of gout tends to get younger, 70% of patients are youths, the frequently-occurring age is between 20 and 40 years old, the youngest patient is only 14 years old, and the incidence rate of gout tends to increase year by year.

At present, the cause and pathogenesis of gout are not fully determined, but hyperuricemia is the most important biochemical basis of gout. Generally, gout is caused by excessive uric acid in the body and the accumulation of sodium urate crystals in joints, body fluids and tissues. Uric acid is converted (oxidized) from purine, and the chemical structural skeleton of uric acid molecules is the same as the chemical molecular structural skeleton of purine molecules, as shown below:

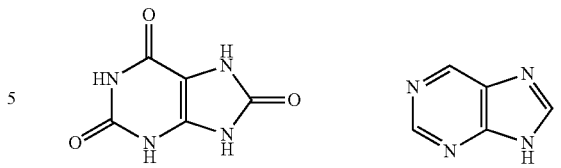

Uric acid (uric acid molecule skeleton)   purine (purine molecule skeleton)

Abnormal changes in the activity of a series of enzymes (especially xanthine invertase XOR) in purine metabolism result in the generation of excessive uric acid, the concentration of uric acid in local blood is increased due to the poor metabolism of uric acid in local joints, and the deposition of local sodium urate crystals results in joint pain, swelling, crystals (i.e. gout crystals) and other symptoms.

At present, the most commonly used oral preparations for treating gout include non-steroidal anti-inflammatory medicine, pain relieving medicine and medicine for inhibiting the activity of purine oxidase, e.g., the pain relieving medicine including indometacin, ibuprofen, meloxicam and celecoxib as well as glucocorticoids, but the oral medicine only has the anti-inflammatory and analgesic effects and has the largest defect of incapability of permanent treatment.

Although the oral preparations such as febuxostat, allopurinol, benzbromarone and colchicine can inhibit the generation of uric acid or increase the metabolism of uric acid by inhibiting the activity of xanthine invertase (XOR), at present, the medicine is orally taken for systemic administration, the dosage is high, therefore, it has great side effects on the visceral organs of the human body, and the patients with cardiovascular and cerebrovascular diseases are easily caused to die. For example, the US Food and Drug Administration (US FDA) website issued warning boxes for the oral preparations of the above small-molecule gout medicine at the public Medicine Evaluation Advisory Committee meetings respectively on Nov. 15, 2017 and Jan. 11, 2019. The warning boxes proved that the cardiovascular and cerebrovascular and all-cause mortality caused by oral administration of febuxostat within the statistic average period of 1 year is 4.1%, and the mortality caused by oral administration of allopurinol is 3.3%. Other kinds of oral gout medicine have great damage to the liver and kidney and other viscera with great harm. Therefore, the harm of the oral gout medicine to the patients, especially to old people, the patients with cardiovascular and cerebrovascular diseases and the patients with chronic diseases, has already increased continuously, and the benefits of these oral dosage forms of the medicine are decreasing continuously. However, these medicine molecules of febuxostat, allopurinol, benzbromarone and colchicine can specifically inhibit the activity of xanthine invertase or help the body to quickly metabolize uric acid, although these oral dosage forms of the medicine have great harm to health, they still almost occupy all the medicine market (Table 1) for treating gout at present, and in addition to this, there are few other effective medicine to use.

TABLE 1

List of Indications and Side Effects of Marketed Gout Medicine

| Medicine | Dosage form | Indications and mechanisms of action | Side effects |
|---|---|---|---|
| Febuxostat (CAS: 144060-53-7) | Oral tablet | Inhibit the activity of xanthine invertase (xanthine oxidase) so as to inhibit the generation of uric acid. | Long-term oral administration results in the cardiovascular and all-cause death (the mortality reaches up to 4.1%). |
| Allopurinol (CAS: 315-30-0) | Oral tablet | Be suitable for chronic gout, and inhibit the generation of uric acid. | Anaphylaxis is large, and the application is limited (the mortality reaches up to 3.3%). |
| Benzbromarone (CAS: 3562-84-3) | Oral tablet | Promote the metabolism and excretion of uric acid. | Hepatotoxicity is large and results in the increase of aspartate aminotransferase, glutamic pyruvic transaminase and alkaline phosphatase. |
| Colchicine (CAS: 64-86-8) | Oral tablet | Be suitable for acute gout and relieving the pain and preventing gout recurrence. | The side effect on the gastrointestinal tract is extremely large, and thus, the range of application is limited and is less than 2% on the market. |
| Topiroxostat (CAS: 577778-58-6) | Oral tablet | Similar to febuxostat. | The metabolism after oral administration has great side effect on the liver and bile. |
| Lesinurad (CAS: 878672-00-5) | Oral tablet | Promote the metabolism and excretion of uric acid, and reduce the concentration of uric acid in blood. | The metabolism after oral administration is harmful to the liver and kidney. |

At present, there is a practical and urgent need to reduce the toxic and side effects of the medicine, improve the medication safety and the medicine use compliance of patients and improve the treatment effect of patients.

SUMMARY

The disclosure provides an external nano liniment for gout and a preparation method thereof. A traditional oral dosage form for gout is changed into the dosage form of the locally applied nano liniment. Compared with the traditional oral dosage form, the external nano liniment has the following effects that 1) the local administration dosage is low, the defects of oral administration are overcome, and the influence of medicine on the visceral organs of a body and the health of patients with cardiovascular and cerebrovascular diseases is basically eliminated; 2) the local full administration is achieved, the clinical effect is quick, uric acid in blood is reduced, gout crystals are eliminated, and the symptoms of gout are fundamentally relieved; and 3) the use is facilitated, and the compliance rate of patients is increased.

The specific technical feature of the disclosure is as follows:

In the first aspect, the disclosure provides an external nano liniment for gout. The external nano liniment includes a cream phase and nanoparticles dispersed in the cream phase, wherein the nanoparticles are of a coating structure having a water phase, an oil phase and a water phase in sequence from inside to outside, active ingredients used for treating gout are embedded or dispersed in the water phase and/or oil phase of the nanoparticles, and a particle size distribution of the nanoparticles is in a range of 1200 nm.

The liniment preparation of the disclosure is externally applied. Compared with oral preparations for treating gout in the prior art, the external nano liniment has the effect of no need of oral administration. Compared with general external preparations, the external nano liniment (for example, the particle size distribution of the nanoparticles in a range of 1200 nm) of the disclosure has the effects that the transdermal absorption efficiency of the active ingredients can be greatly improved, thus, the medicine effect is increased, the medicine composition dosage is lower, and the side effects are less. Therefore, the nano liniment can be locally applied to gout parts directly by hand for nano transdermal absorption, has no side effect on the viscera of a human body, has the effects of good and quick effects and higher safety and can be used for treating the symptoms of gout, greatly reducing the level of uric acid in blood and dissolving gout crystals, and even completely eliminating the gout crystals. The external nano liniment is beneficial to patients with gout, especially the patients with various complications such as cardiovascular and cerebrovascular diseases, old people and chronic patients, and the medicine use compliance of the patients can be increased.

Specifically, according to the external nano liniment for gout of the disclosure, the active ingredients with treatment effects are embedded or dispersed in the water phase and/or the oil phase of the nanoparticles, the nanoparticles are of a water phase-oil phase-water phase alternate coating structure, and the structure simulates the multi-layer human skin structure and human cell structure (that is, the water phase and the oil phase are overlapped) so as to promote the active ingredients to transport and deliver to endothelial cells. For example, when the nanoparticles are located on the water phase layer of the skin or cell structure, water-soluble substances in the water phase of the nanoparticles are dissolved, and the active ingredients are released at a fixed point and play a role on the water phase layer of the skin or cell structure; after "peeling off" the water phase, the residual nanoparticles continue to permeate into the oil phase layer of the skin or cell structure, at the moment, oil-soluble substances in the oil phase of the nanoparticles are dissolved, and the active ingredients are released at a fixed point and play a role on the oil phase layer of the skin or cell structure; and the nanoparticles permeate layer by layer like this and can reach deep layers of the skin and cells, and the technical problem of difficulty in transdermal transfer of active ingredients is solved.

In conclusion, the oral medicine is prepared by the disclosure into the dosage form (preparation) of the nano liniment, the nano liniment is locally and quickly absorbed through local application, and the medicine molecules can be conveyed and transferred from the local parts of the human body to the blood circulation system of the whole body so as to achieve the clinical effect of systemic administration. The new administration mode (path) of systemic medicine delivery through local administration can overcome various defects of an existing administration mode for treating local diseases through systemic administration, and especially, great damage to the visceral organs of the human body is caused by systemic oral administration and systemic injection administration. It is favorable for treating and preventing local diseases and chronic diseases and is beneficial to the health of people and long-term medication safety, and the new administration mode is worthy of great popularization and generalization.

Preferably, the active ingredients include at least one of 4-hydroxymethyl phenyl-beta-D-glucopyranoside, febuxostat, allopurinol, benzbromarone, colchicine, topiroxostat, lesinurad, etoricoxib, meloxicam, diclofenac sodium, diclofenac potassium, probenecid, indometacin, ibuprofen, loxoprofen, piroxicam, celecoxib, dexketoprofen trometamol, acetohexamide, camphor, borneol and mint.

Preferably, a single active ingredient of the active ingredients is in a content of 0.01-10% with respect to a total weight of the nano liniment.

Preferably, when the active ingredients are a single active ingredient, a content of the active ingredients is 0.1-10% with respect to the total weight of the nano liniment. When the active ingredients are multiple active ingredients, a sum content of the different active ingredients is 0.4-10% with respect to the total weight of the nano liniment.

The above content range of the active ingredients is summarized from data of embodiments of the disclosure.

Preferably, the particle size distribution of the nanoparticles is in a range of 1100 nm, more preferably in a range of 150 nm.

In the second aspect, the disclosure provides use of 4-hydroxymethyl phenyl-beta-D-glucopyranoside to a preparation of the external nano liniment for gout.

The disclosure further finds for the first time that the 4-hydroxymethyl phenyl-beta-D-glucopyranoside has a good treatment effect on gout, and it has a good analgesic effect and has good treatment effects of relieving meridians, increasing blood microcirculation, reducing the level of uric acid in blood, dissolving gout crystals and eliminating lumps.

In the third aspect, the disclosure provides a preparation method of the external nano liniment for gout, including the following steps:
1) dissolving the active ingredients into the water phase and/or the oil phase;
2) adding a part of the water phase to the stirred oil phase to obtain hydrated oil phase nanoparticles;
3) then adding the hydrated oil phase nanoparticles to a part of the stirred water phase to obtain nanoparticles; and
4) then adding the cream phase to the stirred nanoparticles to obtain the nano liniment.

The external nano liniment for gout of the above-mentioned structure can be prepared by using the above method, the size of the nanoparticles is at the nanoscale, the permeation effect is good, and the effect is quick.

Preferably, in the step 1), water-soluble active ingredients of the active ingredients are dissolved in the water phase; fat-soluble active ingredients of the active ingredients are added to the water phase, a pH of a solution is adjusted to 4-9, or ethanol (0.1-15 wt %) is added for solubilization; or the fat-soluble active ingredients are added to the oil phase to be heated for hydrotropy.

Preferably, in the steps 1)-4), a stirring speed of the stir is 10-5000 rpm, and a stirring temperature is 5-95° C.

Preferably, in the step 2), a weight ratio of the water phase to the hydrated oil phase is 1:1000-1:10, and the oil phase includes an oil and a surfactant that a weight ratio of the oil to the surfactant is 10:1-1:10.

Preferably, in the step 2), the oil is caprylic capric triglyceride and/or medium chain triglyceride (e.g., Labrafac Lipophile WL 1349), and the surfactant is selected from one or more of PEG-40 hydrogenated castor oil, polyoxyethylated castor oil, polysorbate-20 and polysorbate-80.

Preferably, in the step 3), a weight ratio of the hydrated oil phase nanoparticles to the nanoparticles is 1:1000-1:10.

Preferably, in the step 4), a weight ratio of the cream phase to the nano liniment is 1:1000-3:10.

Preferably, in the step 4), the cream phase is a home-made cream phase or Pemulen TR1, Pemulen TR2 and other cream phase (agent) emulsifiable pastes.

In the research and development process of the preparation, the team of the disclosure also used surfactants and lipids (oil) such as polyoxyethylated castor oil (EL35), polysorbate-20 and polysorbate-80 and medium chain triglyceride (such as Labrafac Lipophile WL 1349) in the oil phase, had carried out experiments in various weight ratios, and had tested the home-made cream phase as well as Pemulen TR1, Pemulen TR2 and other emulsifiable pastes. The results showed that the nano liniment prepared by using the system of the disclosure had the effects of small size, uniform and symmetric particle size distribution, stability, safety and reliability under actual use conditions. The nano liniment could eliminate gout crystals, could greatly reduce the level of uric acid in the blood of the whole body, and had an effective treatment effect on the symptoms of gout.

Preferably, a preparation method of the home-made cream phase includes the following steps:
adding a water phase of the cream phase to water to stir and dissolve, and heating to 70-90° C.;
heating a oil phase of the cream phase to 70-90° C. to dissolve; and
slowly adding the oil phase of the cream phase to the water phase of the cream phase at a stirring speed of 1000-2000 rpm, stirring at a high speed of 1500-2000 rpm for 5-15 minutes, then reducing a speed to 400-800 rpm and cooling to 35-45° C., then adding an addition phase, cooling to a room temperature, and stopping stirring.

Preferably, the water phase of the cream phase includes the following components in parts by weight: 80-85 parts of water, 0.1-0.5 part of dipotassium glycyrrhizinate, 0.05-0.15 part of allantoin, 0.1-0.3 part of carbomer, 0.5-1.5 parts of nicotinamide, 0.01-0.05 part of sodium hyaluronate, 0.05-0.15 part of methylparaben, 2-4 parts of glycerol, 2-4 parts of propylene glycol and 2-4 parts of butanediol.

Preferably, the oil phase of the cream phase includes the following components in parts by weight: 1-3 parts of cetostearyl alcohol, 0.3-0.7 part of PEG-100 stearate, 0.3-0.7 part of glyceryl stearate, 0.3-0.7 part of polydimethylsiloxane, 2-4 parts of caprylic capric triglyceride, 0.1-0.3 part of stearic acid, 0.6-1.0 part of mineral oil, 0.3-0.5 part of propyl hydroxybenzoate, 0.3-0.7 part of avocado oil, 0.3-0.7 part of jojoba oil and 0.3-0.7 part of evening primrose oil.

Preferably, the addition phase includes the following components in parts by weight: 0.1-0.3 part of triethanolamine, 0.4-0.8 part of phenoxyethanol and 0.05-0.15 part of essence.

Compared with the commercially available similar cream phase (agent) product, the cream phase prepared by using the above method has the following effects that 1) good protection and long-term stabilization effects are achieved on the nanoparticles; 2) the nano liniment itself can be assisted to quickly realize transdermal absorption, so that the transdermal absorption rate of the active ingredients is increased; and 3) the cream phase itself has good moistening and repairing effects on the skin.

Compared with the prior art, the disclosure has the beneficial effects:

(1) According to the disclosure, the traditional oral dosage form for gout is changed into the locally applied nano liniment. Compared with the traditional oral dosage form, the external nano liniment has the following effects that ① the local administration dosage is low, the defects of oral administration are overcome, and the influence of medicine on the visceral organs of a body and the health of patients with cardiovascular and cerebrovascular diseases is basically eliminated; ② the local full administration is achieved, the clinical effect is quick, uric acid in blood is reduced, gout crystals are eliminated, and the symptoms of gout are fundamentally relieved; and ③ the use is facilitated, and the compliance rate of patients is increased.

(2) According to the disclosure, a nano transdermal administration technique and a new manufacturing method are used for preparing gout medicine molecules into the nano liniment, and the nano liniment is locally applied to patients with gout on trial. The results show that the transdermal nano liniment for gout has the effects of stability, safety and reliability, after the nano liniment with different medicine concentrations and dosages is applied for a few days to a few weeks on trial, the gout treatment effect is obvious, even gout crystals can be completely eliminated, the symptoms of gout are obviously improved and treated, the level of uric acid is greatly reduced, and therefore, the applied medicine for gout can be widely applied and generalized on a large scale.

(3) The disclosure finds for the first time that the 4-hydroxymethyl phenyl-beta-D-glucopyranoside has a good treatment effect on gout, and it has a good analgesic effect and has good treatment effects of relieving meridians, increasing blood microcirculation, reducing the level of uric acid in blood, dissolving gout crystals and eliminating lumps.

DESCRIPTION OF THE EMBODIMENTS

Figure 1:
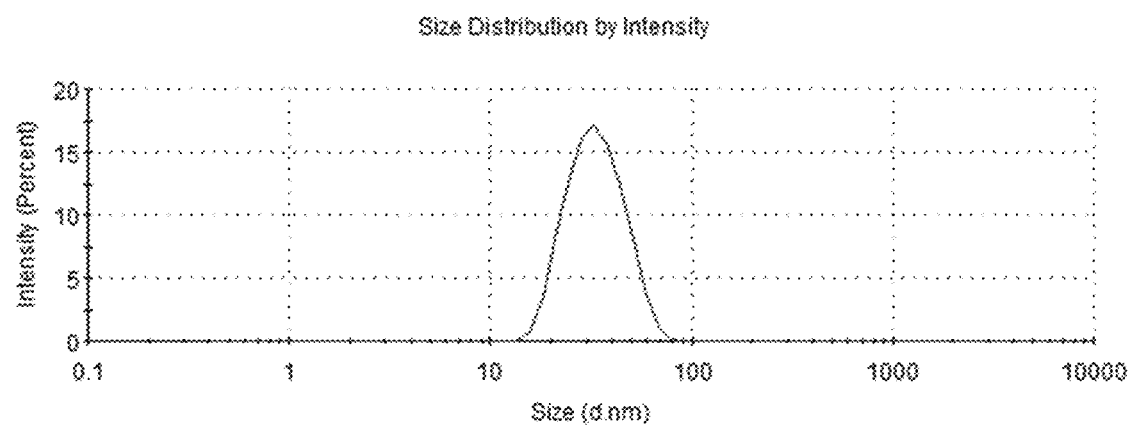
FIG. 1 is a particle size and its distribution diagram of a febuxostat nano liniment sample (low concentration).

The disclosure will be further described with reference to embodiments.

General Embodiment

An external nano liniment for gout includes a cream phase and nanoparticles dispersed in the cream phase, the nanoparticles are of a coating structure having a water phase, an oil phase and a water phase in sequence from inside to outside, active ingredients used for treating the gout are embedded or dispersed in the water phase and/or the oil phase of the nanoparticles, and a particle size distribution of the nanoparticles is in a range of 1-200 nm, preferably in a range of 1-100 nm, more preferably in a range of 1-50 nm.

Preferably, the active ingredients include at least one of 4-hydroxymethyl phenyl-beta-D-glucopyranoside, febuxostat, allopurinol, benzbromarone, colchicine, topiroxostat, lesinurad, etoricoxib, meloxicam, diclofenac sodium, diclofenac potassium, probenecid, indometacin, ibuprofen, loxoprofen, piroxicam, celecoxib, dexketoprofen trometamol, acetohexamide, camphor, borneol and mint.

Preferably, a single active ingredient of the active ingredients is in a content of 0.01-10% with respect to a total weight of the nano liniment. Preferably, when the active ingredients are a single active ingredient, a content of the active ingredients is 0.1-10% with respect to the total weight of the nano liniment. When the active ingredients are multiple active ingredients, a sum content of the different active ingredients is 0.4-10% with respect to the total weight of the nano liniment.

A preparation method of the above external nano liniment for gout included the following steps:
1) dissolving the active ingredients into the water phase and/or the oil phase, wherein water-soluble active ingredients were dissolved in the water phase; fat-soluble active ingredients were added to the water phase, a pH of a solution was adjusted to 4-9, or ethanol (0.1-15 wt %) was added for solubilization; or the fat-soluble active ingredients were added to the oil phase to be heated for hydrotropy;
2) adding a part of the water phase to the stirred oil phase (10-5000 rpm, 5-95° C.) to obtain hydrated oil phase nanoparticles, wherein a weight ratio of the water phase to the hydrated oil phase was 1:1000-1:10 and the oil phase included an oil and a surfactant, which a weight ratio of the oil to the surfactant was 10:1-1:10, the oil was caprylic capric triglyceride and/or medium chain triglyceride (e.g., Labrafac Lipophile WL 1349), the surfactant was selected from one or more of PEG-40 hydrogenated castor oil, polyoxyethylated castor oil (EL35), polysorbate-20 and polysorbate-80;
3) then adding the above hydrated oil phase nanoparticles to a part of the stirred water phase (10-5000 rpm. 5-95° C.) to obtain nanoparticles, wherein a weight ratio of the hydrated oil phase nanoparticles to the nanoparticles was 1:1000-1:10; and
4) then adding the cream phase to the above stirred nanoparticles (10-5000 rpm, 5-95° C.) to obtain the nano liniment, wherein a weight of the cream phase to the nano liniment was 1:1000-3:10, the cream phase was a home-made cream phase or Pemulen TR1, Pemulen TR2 and other cream phase (agent) emulsifiable pastes.

Preferably, a preparation method of the home-made cream phase included the following steps:
adding the water phase of the cream phase to water to stir and dissolve, and then heating to 70-90° C., wherein the water phase of the cream phase included the following components in parts by weight: 80-85 parts of water, 0.1-0.5 part of dipotassium glycyrrhizinate, 0.05-0.15 part of allantoin, 0.1-0.3 part of carbomer, 0.5-1.5 parts of nicotinamide, 0.01-0.05 part of sodium hyaluronate, 0.05-0.15 part of methylparaben, 2-4 parts of glycerol, 2-4 parts of propylene glycol and 2-4 parts of butanediol;

heating the oil phase of the cream phase to 70-90° C. to dissolve, wherein the oil phase of the cream phase included the following components in parts by weight: 1-3 parts of cetostearyl alcohol, 0.3-0.7 part of PEG-100 stearate, 0.3-0.7 part of glyceryl stearate, 0.3-0.7 part of polydimethylsiloxane, 2-4 parts of caprylic capric triglyceride, 0.1-0.3 part of stearic acid, 0.6-1.0 part of mineral oil, 0.3-0.5 part of propyl hydroxybenzoate, 0.3-0.7 part of avocado oil, 0.3-0.7 part of jojoba oil and 0.3-0.7 part of evening primrose oil; and slowly adding the oil phase of the cream phase to the water phase of the cream phase at a stirring speed of 1000-2000 rpm, stirring at a high speed of 1500-2000 rpm for 5 to 15 minutes, then reducing a speed to 400-800 rpm, lowering a temperature to 35-45° C., after adding an addition phase, lowering a temperature to a room temperature, and stopping the stirring, wherein the addition phase included the following components in parts by weight: 0.1-0.3 part of triethanolamine, 0.4-0.8 part of phenoxyethanol and 0.05-0.15 part of essence.

Detailed Embodiment

We had carried out many experiments and verification, and only some typical experiments as an illustration were listed as follows.

The particle size (nm) and its distribution were determined by using a Malvern Light Scattering Particle Sizer ZS90. The blood uric acid concentration (the uric acid value unit is µmol/L) was determined by using a Sinocare EA-11 blood uric acid tester (Sinocare Inc.).

The prepared nano liniment was applied to some patients with gout on trial. The gout treatment effect was obvious. The local application dosage was far below the dosage of the same oral medicine. The total dosage was safe.

Method of application: the nano liniment was applied to the gout parts (most foot joints, some hand joints or other parts) twice a day (every morning and evening), 1 ml of the corresponding nano liniment was applied every time, the gout (crystal) parts were photographed at different points in time before and after the nano liniment was applied, and the blood uric acid concentration (i.e. the uric acid value under fasting) of some patients with obvious crystal dissolution and lump elimination was also determined as a reference.

Embodiment 1A: Preparation of Febuxostat Nano Liniment and Effect of Application (Low Concentration with 0.1%)

In a container A (A phase), PEG-40 hydrogenated castor oil (5 g), caprylic capric triglyceride (2 g) and sorbitan oleate (1 g) were uniformly mixed at 50° C., and febuxostat (0.05 g) was added to be heated to 75° C. In a container B (B phase), water (90 g) and triethanolamine (about 1 g) were added at room temperature to stir (the pH was adjusted to 7), and then phenoxyethanol (1 g), febuxostat (0.05 g), hydroxyethyl cellulose (0.2 g) and carbomer (0.2 g) were added to be gradually heated to 75° C. while stirring so as to completely dissolve. A solution (0.16 g) in the container B was added to the container A in stirring. The stirring speed was adjusted to 1500 rpm. After 10 minutes, liquid in the container A was added to the container B during stirring and was heated to 75° C. and adjusted the stirring speed to 1500 rpm. After 10 minutes, cooling was started (50° C.) and the stirring speed was reduced (700 rpm). Then, the prepared nano cream (agent) C phase (3 g) was added to be uniformly stirred. A white finished product of the febuxostat nano liniment was obtained. Its average particle size was 31.33 nm (by intensity Z-average size), and the volume distribution particle size ranged from 21.60 nm (D10) to 50.50 nm (D90). The particle size and its distribution of the febuxostat nano liniment sample (low concentration) were shown in FIG. 1.

Embodiment 1B: Preparation of Febuxostat Nano Liniment and Effect of Application (Medium Concentration with 1%)

Figure 2:
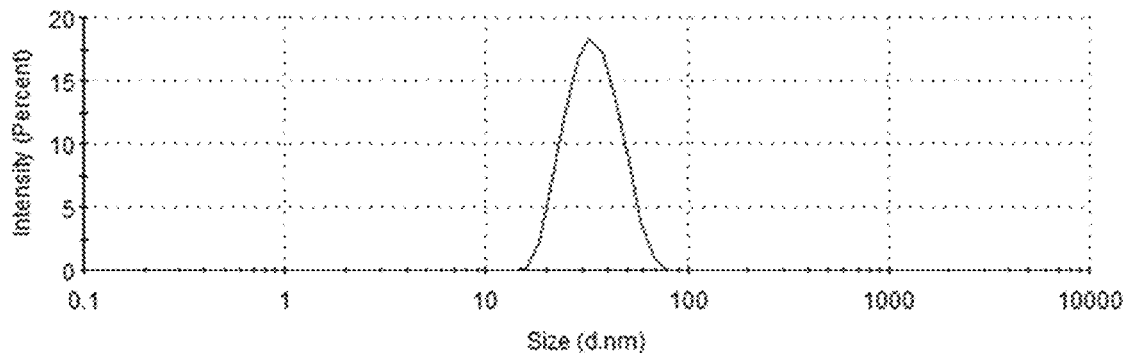
FIG. 2 is a particle size and its distribution diagram of a febuxostat nano liniment sample (medium concentration).

The preparation steps of the febuxostat medium-concentration nano liniment were basically the same as the above Embodiment 1A. The total concentration of febuxostat was 1% (0.2% in the A phase, 0.8% in the B phase, the pH of the B phase was adjusted to 7.5). Ultimately. a white finished product of the febuxostat nano liniment was obtained. Its particle size was 32.18 nm (by intensity Z-average size), and the volume distribution particle size ranged from 22.60 nm (D10) to 50.30 nm (D90). The particle size and its distribution of the febuxostat nano liniment sample (medium concentration) were shown in FIG. 2.

Embodiment 1C: Preparation of Febuxostat Nano Liniment and Effect of Application (High Concentration with 3%)

Figure 3:
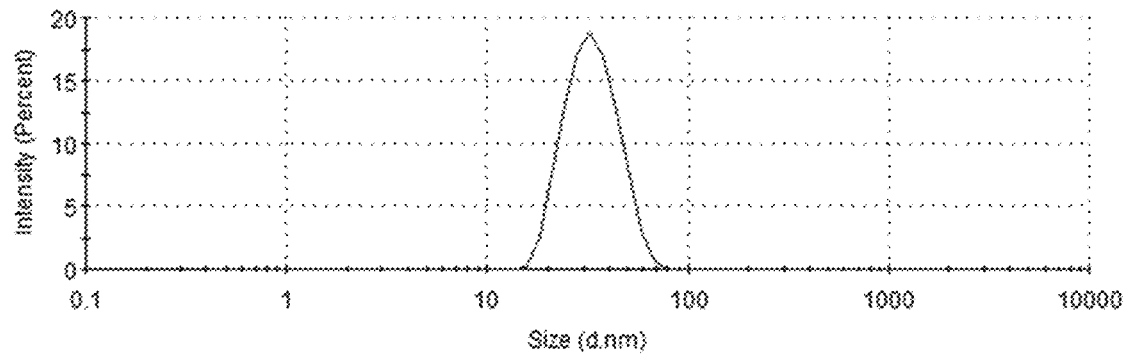
FIG. 3 is a particle size and its distribution diagram of a febuxostat nano liniment sample (high concentration).

The preparation steps of the febuxostat high-concentration nano liniment were basically the same as the above Embodiment 1A. The total concentration of febuxostat was 3% (0.5% in the A phase, 2.5% in the B phase, the pH of the B phase was adjusted to 8). Ultimately, a white finished product of the febuxostat nano liniment was obtained. Its particle size was 31.41 nm (by intensity Z-average size), and the volume distribution particle size ranged from 22.20 nm (D10) to 49.00 nm (D90). The particle size and its distribution of the febuxostat nano liniment sample (high concentration) were shown in FIG. 3.

Preliminary Human Trial Results of Preparation (n=5)

Figure 15:
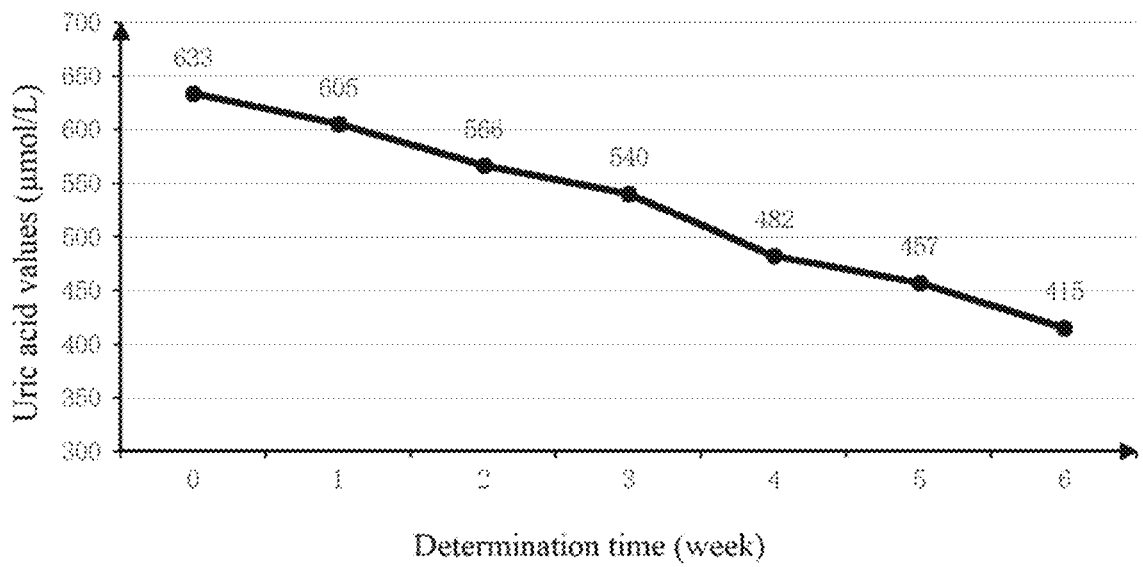
FIG. 15 is a change diagram of uric acid values of Case 1.
Figure 16:
FIG. 16 shows comparative photos of the patient with gout in Case 1 in different periods before and after the medicine is used.

The low-dosage (low-concentration) of febuxostat preparation had no obvious effect on crystal dissolution of the gout crystals. The medium-dosage (medium-concentration) and high-dosage (high-concentration) of febuxostat preparations had obvious effects on crystal dissolution of the gout crystals, and the crystals of all the patients in test objects within the test period from 1 week to 6 weeks were softened and diminished or even completely eliminated. There was no significant difference in the effects of the medium dosage and the high dosage on the elimination of the crystals. A group of change photos with typical crystal dissolution effects were shown in Case 1 (FIG. 16, high dosage). The determination of the blood uric acid values (fasting) of the patients found that the change in uric acid was great and obvious, the level of uric acid in blood was greatly reduced, and the level of uric acid was decreased with the period of administration (as shown in FIG. 15).

Embodiment 2A: Preparation of 4-hydroxymethyl phenyl-beta-D-glucopyranoside Nano Liniment and Effect of Application (Low Concentration with 0.1%)

Figure 4:
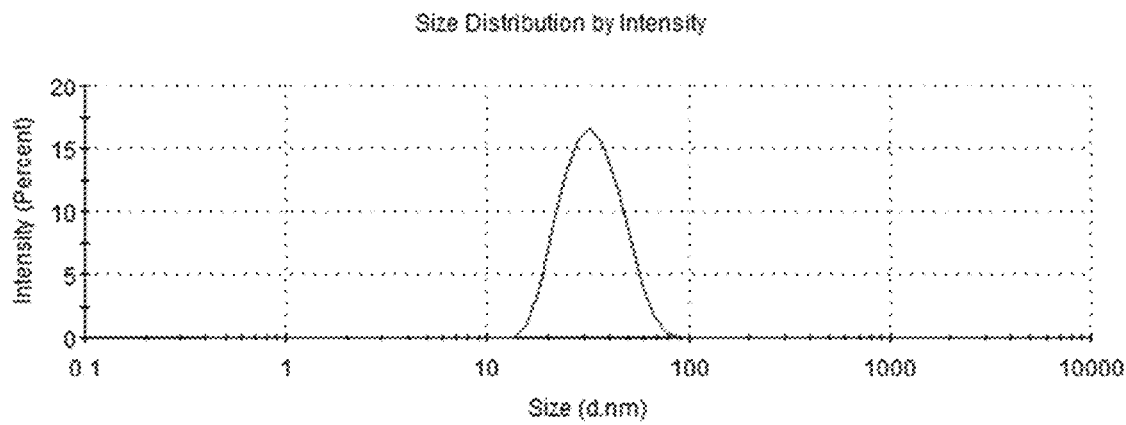
FIG. 4 is a particle size and its distribution diagram of a 4-hydroxymethyl phenyl-beta-D-glucopyranoside nano liniment sample (low concentration).

In a container A (A phase), PEG-40 hydrogenated castor oil (8 g), caprylic capric triglyceride (2 g) and sorbitan oleate (1 g) were uniformly mixed at 50° C., and 4-hydroxymethyl phenyl-beta-D-glucopyranoside (0.05 g) was added to be heated to 50° C. In a container B (B phase), water (90 g) and 0.1% of citric acid water solution were added at room temperature to stir (the pH was adjusted to 5), and then phenoxyethanol (1 g), 4-hydroxymethyl phenyl-beta-D-glucopyranoside (0.05 g), hydroxyethyl cellulose (0.2 g) and carbomer (0.2 g) were added to be gradually heated to 50° C. while stirring so as to completely dissolve. A solution (0.22 g) in the container B was added to the container A in stirring. The stirring speed was adjusted to 1500 rpm. After 10 minutes, liquid in the container A was added to the container B during stirring and was heated to 50° C. and adjusted the stirring speed to 2000 rpm. After 10 minutes, cooling was started (40° C.) and the stirring speed was reduced (500 rpm). Then, the prepared nano cream (agent) C phase (5 g) was added to be uniformly stirred. A white finished product of the 4-hydroxymethyl phenyl-beta-D-glucopyranoside nano liniment was obtained. Its particle size was 31.11 nm (by intensity Z-average size), and the volume distribution particle size ranged from 21.20 nm (D10) to 50.70 nm (D90). The particle size and its distribution of the 4-hydroxymethyl phenyl-beta-D-glucopyranoside nano liniment sample (low concentration) were shown in FIG. 4.

Embodiment 2B: Preparation of 4-hydroxymethyl phenyl-beta-D-glucopyranoside Nano Liniment and Effect of Application (Medium Concentration with 1%)

Figure 5:
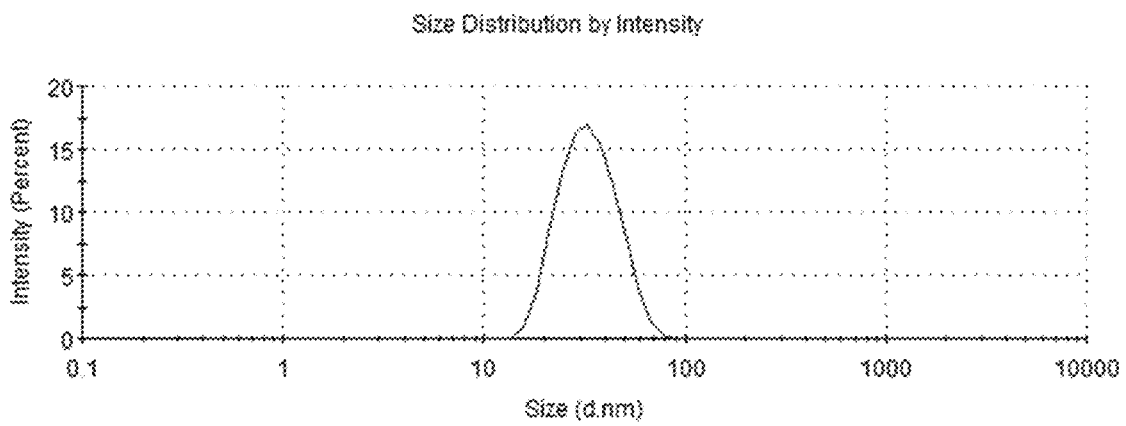
FIG. 5 is a particle size and its distribution diagram of a 4-hydroxymethyl phenyl-beta-D-glucopyranoside nano liniment sample (medium concentration).

The preparation steps of the 4-hydroxymethyl phenyl-beta-D-glucopyranoside medium-concentration nano liniment were basically the same as the above Embodiment 2A. The total concentration of 4-hydroxymethyl phenyl-beta-D-glucopyranoside was 1% (0.1% in the A phase, 0.9% in the B phase, the pH of the B phase was adjusted to 6). Ultimately, a white finished product of the nano liniment was obtained. Its particle size was 31.11 nm (by intensity Z-average size), and the volume distribution particle size ranged from 21.40 nm (D10) to 50.30 nm (D90). The particle size and its distribution of the 4-hydroxymethyl phenyl-beta-D-glucopyranoside nano liniment sample (medium concentration) were shown in FIG. 5.

Embodiment 2C: Preparation of 4-hydroxymethyl phenyl-beta-D-glucopyranoside Nano Liniment and Effect of Application (High Concentration with 5%)

Figure 6:
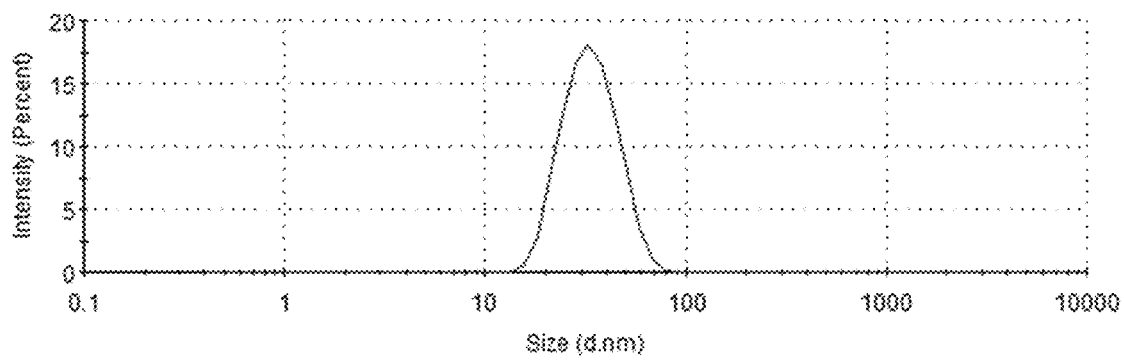
FIG. 6 is a particle size and its distribution diagram of a 4-hydroxymethyl phenyl-beta-D-glucopyranoside nano liniment sample (high concentration).

The preparation steps of the 4-hydroxymethyl phenyl-beta-D-glucopyranoside high-concentration nano liniment were basically the same as the above Embodiment 2A. The total concentration of 4-hydroxymethyl phenyl-beta-D-glucopyranoside was 5% (0.1% in the A phase, 4.9% in the B phase, the pH of the B phase was adjusted to 7). Ultimately, a white finished product of the nano liniment was obtained. Its particle size was 31.59 nm (by intensity Z-average size), and the volume distribution particle size ranged from 22.00 nm (D10) to 49.80 nm. The particle size and its distribution of the 4-hydroxymethyl phenyl-beta-D-glucopyranoside nano liniment sample (high concentration) were shown in FIG. 6.

Preliminary Human Trial Results of Preparation (n=5)

Figure 17:
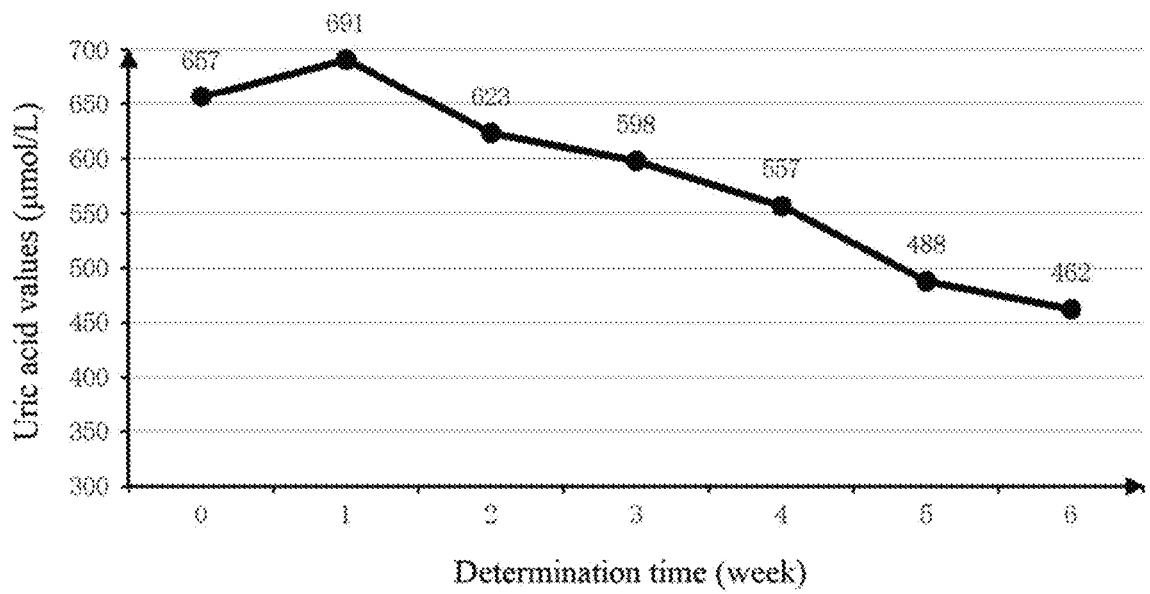
FIG. 17 is a change diagram of uric acid values of Case 2.
Figure 18:
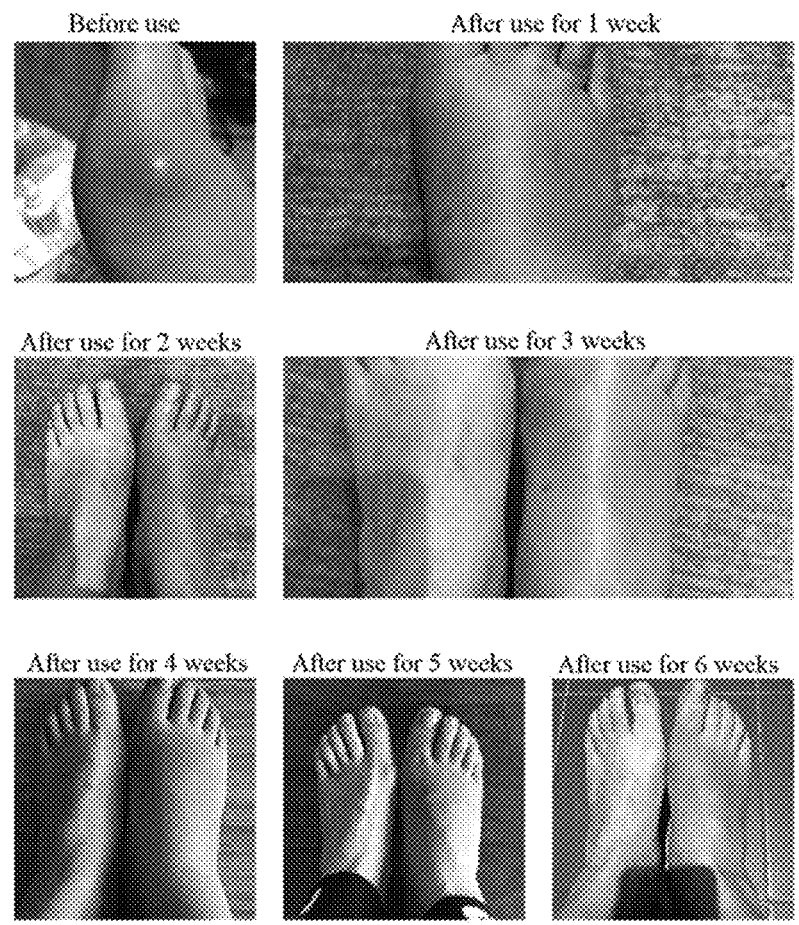
FIG. 18 shows comparative photos of the patient with gout in Case 2 in different periods before and after the medicine is used.

The low-dosage (low-concentration) and medium-dosage of 4-hydroxymethyl phenyl-beta-D-glucopyranoside preparations had no obvious effect on crystal dissolution of the gout crystals. The high-dosage (high-concentration) of 4-hydroxymethyl phenyl-beta-D-glucopyranoside preparation had the obvious effect on crystal dissolution of the gout crystals, and the crystals of all the patients in test objects within the test period from 1 week to 6 weeks were softened and diminished or even completely eliminated. A group of change photos with typical crystal dissolution effects of high dosage were shown in Case 2 (FIG. 18, high dosage). The determination of the blood uric acid values (fasting) of the patients found that the change in the level of uric acid in blood was great, the level of uric acid was greatly reduced, and the level of uric acid was decreased with the period of administration (FIG. 17).

Embodiment 3A: Preparation of Allopurinol Nano Liniment and Effect of Application (Low Concentration with 0.1%)

Figure 7:
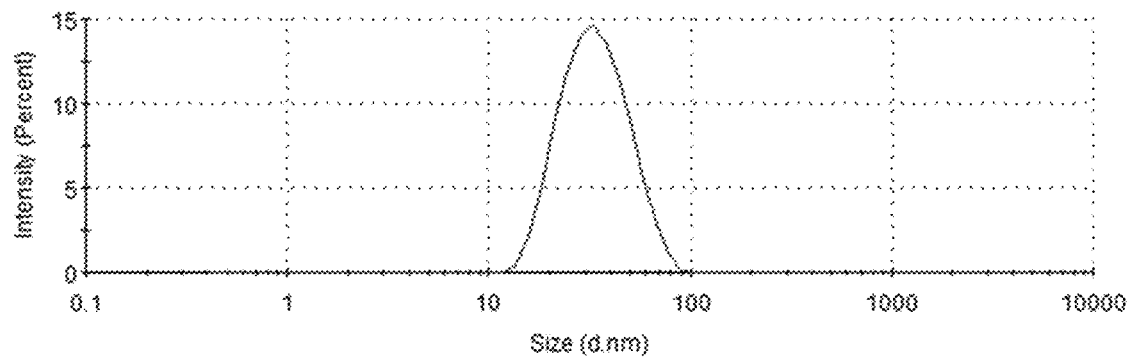
FIG. 7 is a particle size and its distribution diagram of an allopurinol nano liniment sample (low concentration).

In a container A (A phase), PEG-40 hydrogenated castor oil (5 g), caprylic capric triglyceride (2 g) and sorbitan oleate (1 g) were uniformly mixed at 50° C., and allopurinol (0.05 g) was added to be heated to 75° C. In a container B (B phase), water (90 g) and triethanolamine (about 1 g) were added at room temperature to stir (the pH was 7), and then phenoxyethanol (1 g), allopurinol (0.05 g), hydroxyethyl cellulose (0.2 g) and carbomer (0.2 g) were added to be gradually heated to 75° C. while stirring so as to completely dissolve. A solution (0.16 g) in the container B was added to the container A in stirring. The stirring speed was adjusted to 2000 rpm. After 10 minutes, liquid in the container A was added to the container B during stirring and was heated to 75° C., and adjusted the stirring speed to 2000 rpm. After 10 minutes, cooling was started (50° C.) and the stirring speed was reduced (800 rpm). Then, the prepared nano cream C phase (2 g) was added to be uniformly stirred. A white finished product of the nano liniment was obtained. Its particle size was 31.07 nm (by intensity Z-average size), and the volume distribution particle size ranged from 20.20 nm (D10) to 54.90 nm (D90). The particle size and its distribution of the allopurinol nano liniment sample (low concentration) were shown in FIG. 7.

Embodiment 3B: Preparation of Allopurinol Nano Liniment and Effect of Application (High Concentration with 1%)

Figure 8:
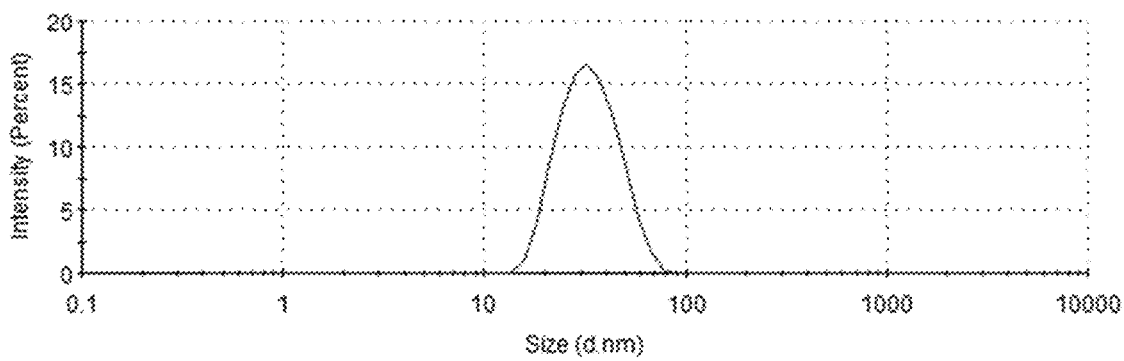
FIG. 8 is a particle size and its distribution diagram of an allopurinol nano liniment sample (high concentration).

The preparation steps of the allopurinol high-concentration nano liniment were basically the same as the above Embodiment 3A. The total concentration of allopurinol was 1% (0.1% in the A phase, 0.9% in the B phase, the pH of the B phase was adjusted to 8). Ultimately, a white finished product of the nano liniment was obtained. Its particle size was 31.11 nm (by intensity Z-average size), and the volume distribution particle size ranged from 21.30 nm (D10) to 50.90 nm. The particle size and its distribution of the allopurinol nano liniment sample (high concentration) were shown in FIG. 8.
Preliminary Human Trial Results of Preparation (n=5)

Figure 19:
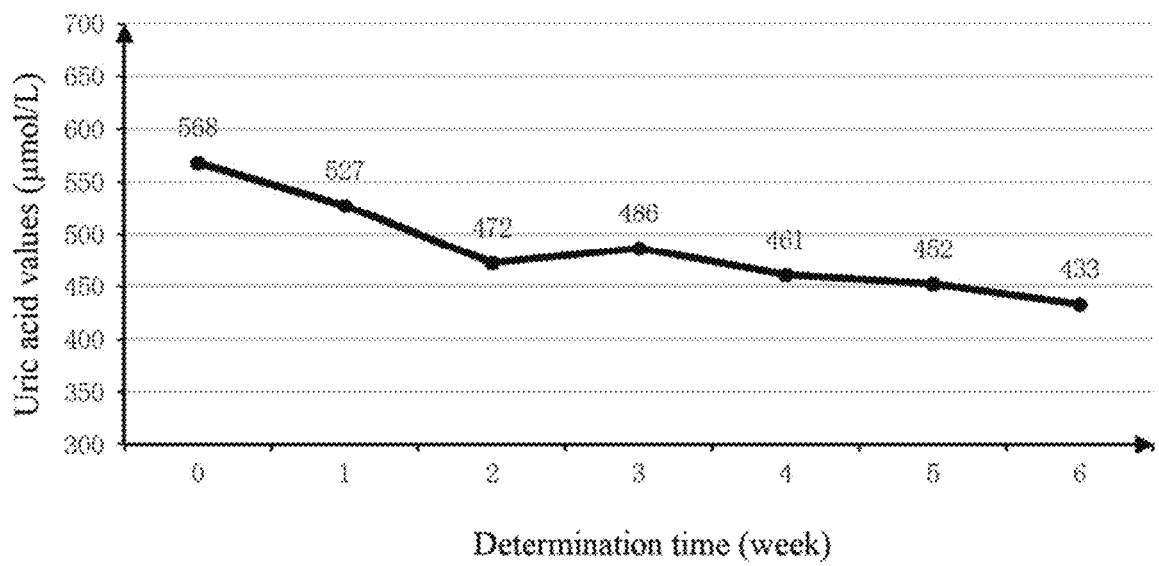
FIG. 19 is a change diagram of uric acid values of Case 3.
Figure 20:
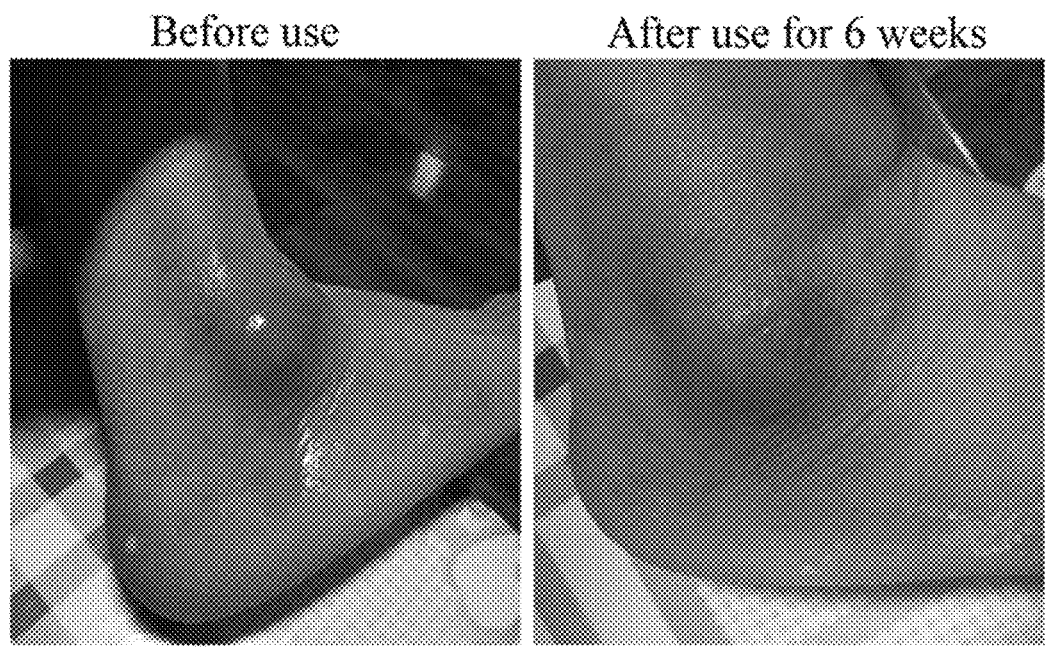
FIG. 20 shows comparative photos of the patient with gout in Case 3 in different periods before and after the medicine is used.

The low-dosage (low-concentration) of allopurinol preparation had no obvious effect on crystal dissolution of the gout crystals. The high-dosage (high-concentration) of allopurinol preparation had the obvious effect on crystal dissolution of the gout crystals, and the crystals of all the patients in test objects within the test period from 1 week to 6 weeks were softened and diminished or even completely eliminated. A group of change photos with typical crystal dissolution effects of high dosage were shown in Case 3 (FIG. 20, high dosage). The determination of the blood uric acid values (fasting) of the patients found that the level of uric acid in blood was obviously reduced, and the level of uric acid was decreased with the period of administration (FIG. 19).

Embodiment 4A: Preparation of Benzbromarone Nano Liniment and Effect of Application (Low Concentration with 0.1%)

Figure 9:
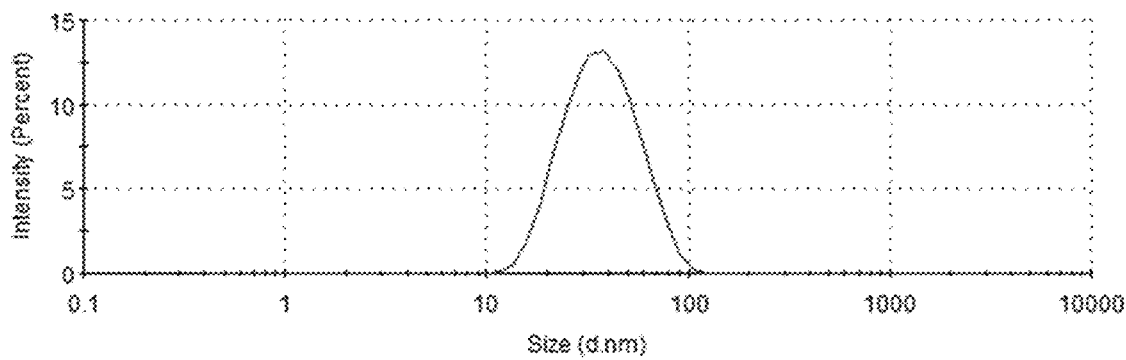
FIG. 9 is a particle size and its distribution diagram of a benzbromarone nano liniment sample (low concentration).

In a container A (A phase), PEG-40 hydrogenated castor oil (6 g), caprylic capric triglyceride (2 g) and sorbitan oleate (1 g) were uniformly mixed at 50° C., and benzbromarone (0.05 g) was added to be heated to 70° C. In a container B (B phase), water (90 g) and triethanolamine (about 1 g) were added at room temperature to stir (the pH was 7.5), and then phenoxyethanol (1 g), benzbromarone (0.05 g), hydroxyethyl cellulose (0.2 g) and carbomer (0.2 g) were added to be gradually heated to 70° C. while stirring so as to completely dissolve. A solution (0.18 g) in the container B was added to the container A in stirring. The stirring speed was adjusted to 1600 rpm. After 10 minutes, liquid in the container A was added to the container B during stirring and was heated to 70° C. and adjusted the stirring speed to 1600 rpm. After 10 minutes, cooling was started (50° C.) and the stirring speed was reduced (800 rpm). Then, the prepared nano cream C phase (3 g) was added to be uniformly stirred. A white finished product of the nano liniment was obtained. Its particle size was 33.16 nm (by intensity Z-average size). and the volume distribution particle size ranged from 21.20 nm (D10) to 63.70 nm (D90). The particle size and its distribution of the benzbromarone nano liniment sample (low concentration) were shown in FIG. 9.

Embodiment 4B: Preparation of Benzbromarone Nano Liniment and Effect of Application (High Concentration with 0.8%)

Figure 10:
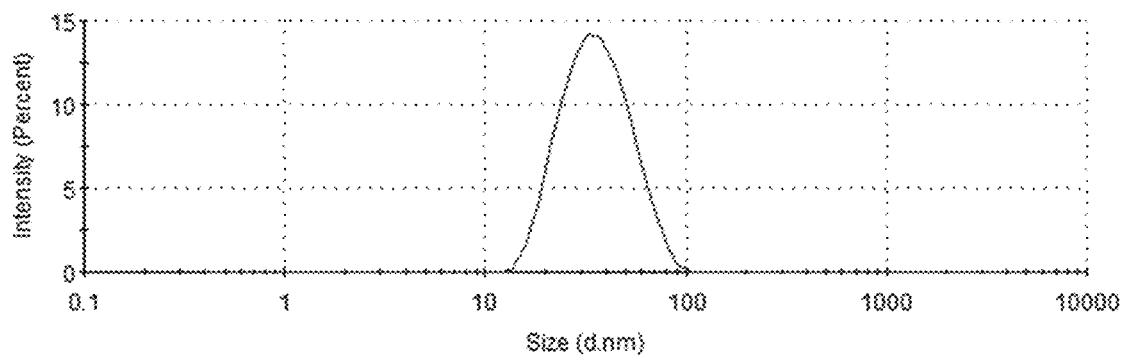
FIG. 10 is a particle size and its distribution diagram of a benzbromarone nano liniment sample (high concentration).

The preparation steps of the benzbromarone high-concentration nano liniment were basically the same as the above Embodiment 4A. The total concentration of benzbromarone was 1% (0.1% in the A phase, 0.7% in the B phase, the pH of the B phase was adjusted to 8). Ultimately, a white finished product of the nano liniment was obtained. Its particle size was 32.93 nm (by intensity Z-average size), and the volume distribution particle size ranged from 21.30 nm (D10) to 58.60 nm (D90). The particle size and its distribution of the benzbromarone nano liniment sample (high concentration) were shown in FIG. 10.
Preliminary Human Trial Results of Preparation (n=5)

Figure 21:
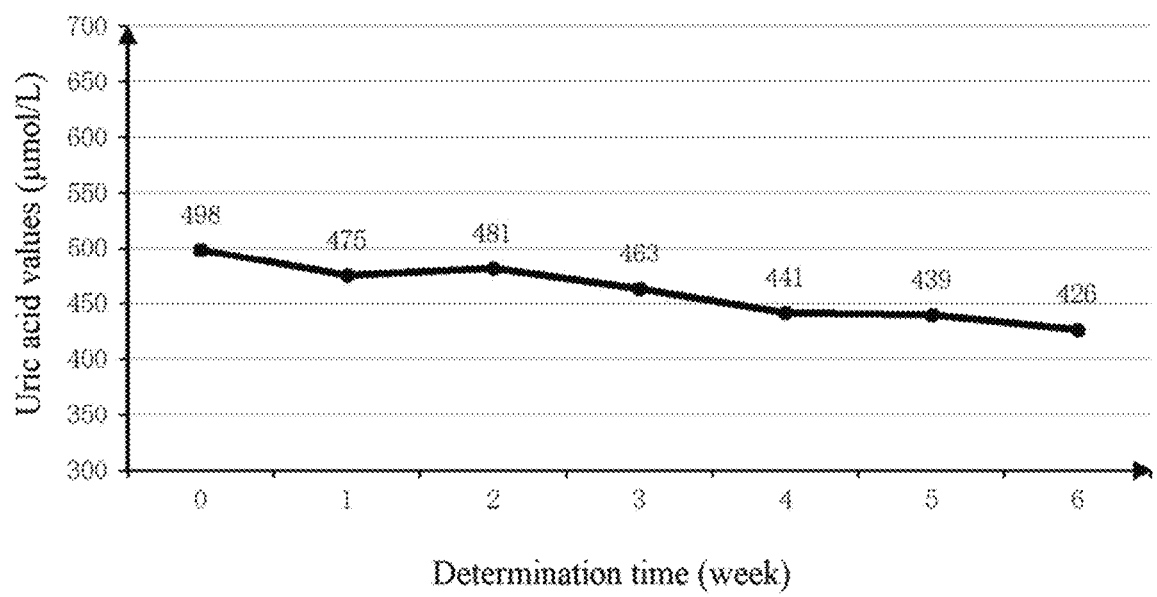
FIG. 21 is a change diagram of uric acid values of Case 4.
Figure 22:
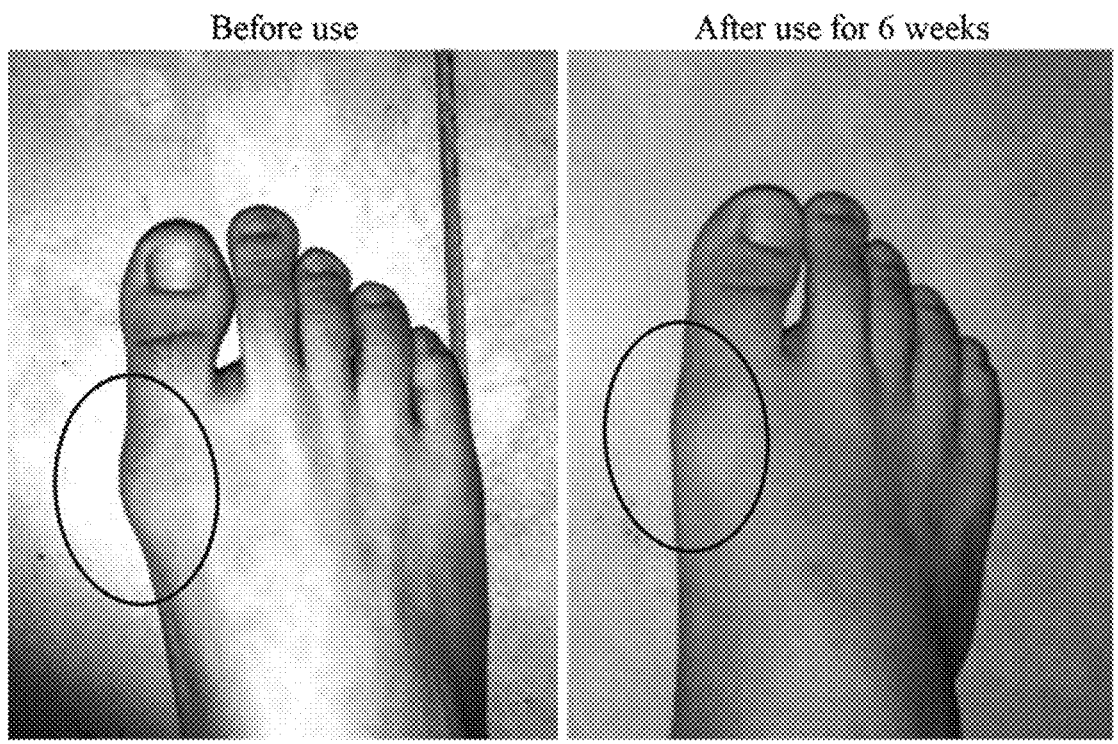
FIG. 22 shows comparative photos of the patient with gout in Case 4 in different periods before and after the medicine is used.

The low-dosage (low-concentration) of benzbromarone preparation had no obvious effect on crystal dissolution of the gout crystals. The high-dosage (high-concentration) of benzbromarone preparation had the obvious effect on crystal dissolution of the gout crystals, and the crystals of all the patients in test objects within the test period from 1 week to 6 weeks were softened and diminished or even completely eliminated. A group of change photos with typical crystal dissolution effects of high dosage were shown in Case 4 (FIG. 22, high dosage). The determination of the blood uric acid values (fasting) of the patients found that the level of uric acid in blood was obviously reduced, and the level of uric acid was decreased with the period of administration (FIG. 21).

Embodiment 5A: Preparation of Benzbromarone and Allopurinol Nano Liniment and Effect of Application (Low Concentration with 0.2% and 0.2%)

Figure 11:
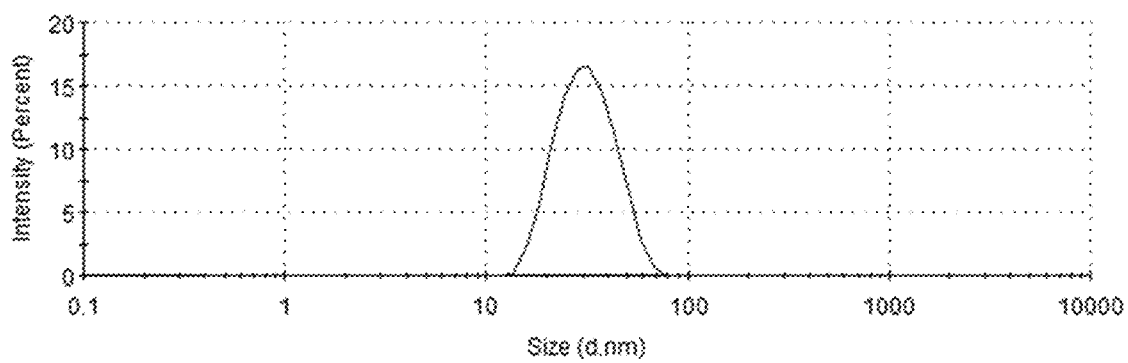
FIG. 11 is a particle size and its distribution diagram of a benzbromarone and allopurinol nano liniment sample (low concentration).

In a container A (A phase), PEG-40 hydrogenated castor oil (6 g), caprylic capric triglyceride (2 g) and sorbitan oleate (1 g) were uniformly mixed at 50° C., and benzbromarone (0.1 g) and allopurinol (0.1 g) were added to be heated to 70° C. In a container B (B phase), water (90 g) and triethanolamine (about 1 g) were added at room temperature to stir (the pH was 7.5), and then phenoxyethanol (1 g), ethanol (2 g), benzbromarone (0.1 g), allopurinol (0.1 g), hydroxyethyl cellulose (0.2 g) and carbomer (0.2 g) were added to be gradually heated to 70° C. while stirring so as to completely dissolve. A solution (0.18 g) in the container B was added to the container A in stirring. The stirring speed was adjusted to 1600 rpm. After 10 minutes, liquid in the container A was added to the container B during stirring and was heated to 70° C. and adjusted the stirring speed to 1600 rpm. After 10 minutes, cooling was started (50° C.) and the stirring speed was reduced (800 rpm). Then, the prepared nano cream C phase (3 g) was added to be uniformly stirred. A white finished product of the nano liniment was obtained. Its particle size was 29.38 nm (by intensity Z-average size), and the volume distribution particle size ranged from 20.00 nm (D10) to 48.20 nm (D90). The particle size and its distribution of the benzbromarone and allopurinol nano liniment sample (low concentration) were shown in FIG. 11.

Embodiment 5B: Preparation of Benzbromarone and Allopurinol Nano Liniment and Effect of Application (High Concentration with 0.5% and 0.5%)

Figure 12:
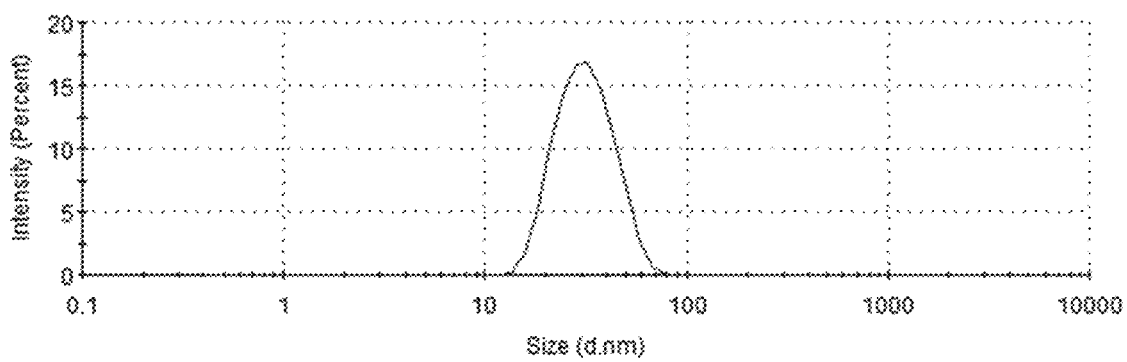
FIG. 12 is a particle size and its distribution diagram of a benzbromarone and allopurinol nano liniment sample (high concentration).

The preparation steps of the benzbromarone and allopurinol high-concentration nano liniment were basically the same as the above Embodiment 5A. The total concentration of benzbromarone was 0.5% (0.4% in the A phase, 0.1% in the B phase), the total concentration of allopurinol was 0.5% (0.1% in the A phase, 0.4% in the B phase), the pH of the B phase was adjusted to 8, and ethanol (5 g) was added. Ultimately, a white finished product of the nano liniment was obtained. Its particle size was 29.52 nm (by intensity Z-average size), and the volume distribution particle size ranged from 20.20 nm (D10) and 48.00 nm (D90). The particle size and its distribution of the benzbromarone and allopurinol nano liniment sample (high concentration) were shown in FIG. 12.

Preliminary Human Trial Results of Preparation (n=5)

Figure 23:
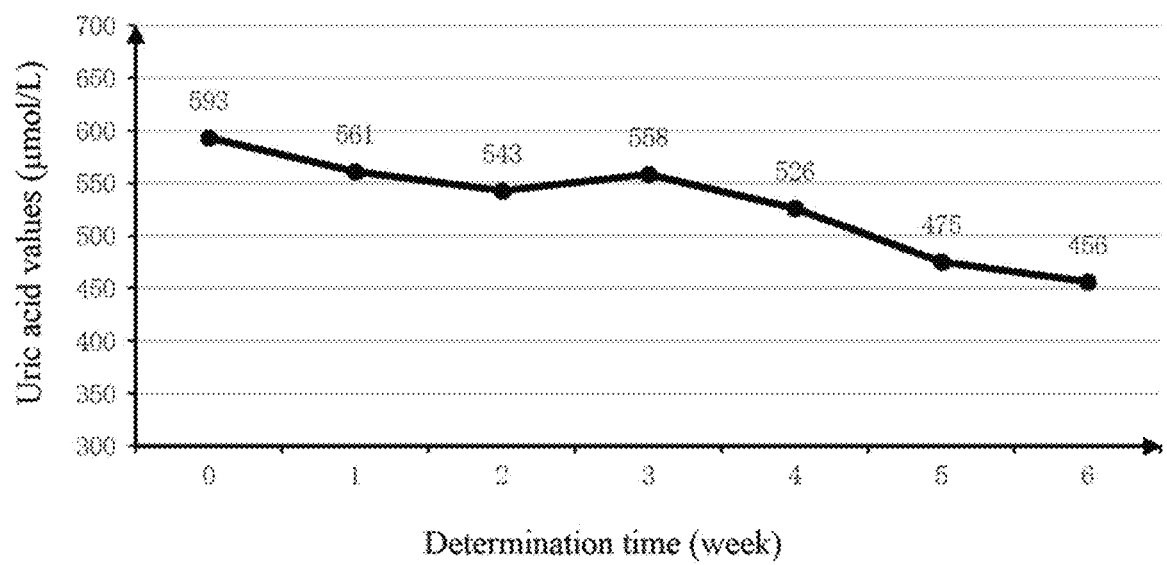
FIG. 23 is a change diagram of uric acid values of Case 5.
Figure 24:
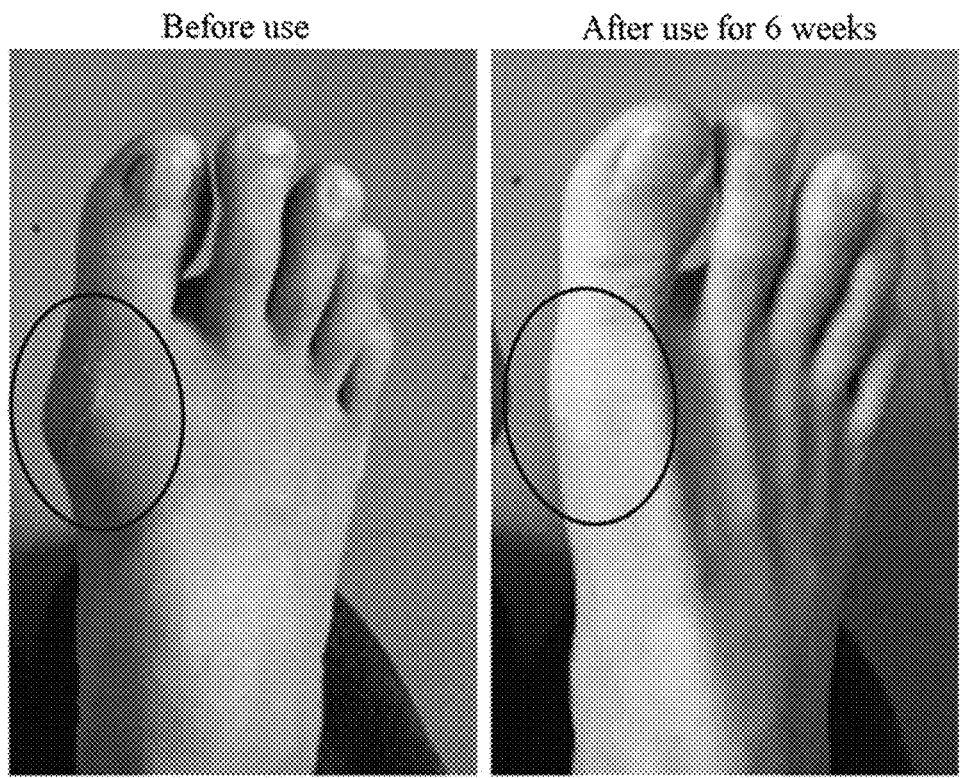
FIG. 24 shows comparative photos of the patient with gout in Case 5 in different periods before and after the medicine is used.

The low-dosage (low-concentration) of benzbromarone and allopurinol preparation had no obvious effect on crystal dissolution of the gout crystals. The high-dosage (high-concentration) of benzbromarone and allopurinol preparation had the obvious effect on crystal dissolution of the gout crystals, and the crystals of all the patients in test objects within the test period from 1 week to 6 weeks were softened and diminished or even completely eliminated. A group of change photos with typical crystal dissolution effects of high dosage were shown in Case 5 (FIG. 24, high dosage). The determination of the blood uric acid values (fasting) of some patients found that the level of uric acid in blood was obviously reduced, and the level of uric acid was decreased with the period of administration (FIG. 23).

Embodiment 6A: Preparation of Febuxostat, Allopurinol and 4-hydroxymethyl phenyl-beta-D-glucopyranoside Nano Liniment and Effect of Application (Low Concentration with 0.2%, 0.2% and 0.2%)

Figure 13:
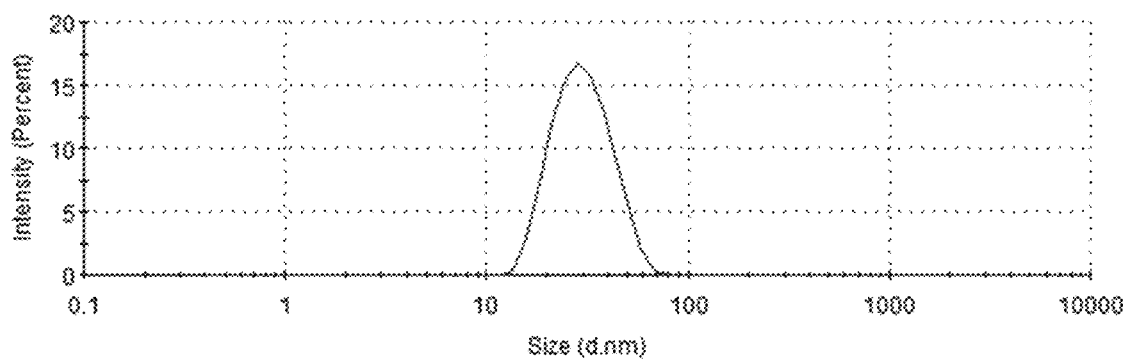
FIG. 13 is a particle size and its distribution diagram of a febuxostat, allopurinol and 4-hydroxymethyl phenyl-beta-D-glucopyranoside nano liniment sample (low concentration).

In a container A (A phase), PEG-40 hydrogenated castor oil (5 g), caprylic capric triglyceride (2 g) and sorbitan oleate (1 g) were uniformly mixed at 60° C., and febuxostat (0.1 g), allopurinol (0.1 g) and 4-hydroxymethyl phenyl-beta-D-glucopyranoside (0.1 g) were added to be heated to 70° C. In a container B (B phase), water (90 g) and triethanolamine (about 1 g) were added at room temperature to stir (the pH was 7.5), and then phenoxyethanol (1 g), ethanol (2 g), febuxostat (0.1 g), allopurinol (0.1 g), 4-hydroxymethyl phenyl-beta-D-glucopyranoside (0.1 g), hydroxyethyl cellulose (0.2 g) and carbomer (0.2 g) were added to be gradually heated to 70° C. while stirring so as to completely dissolve. A solution (0.16 g) in the container B was added to the container A in stirring. The stirring speed was adjusted to 1600 rpm. After 10 minutes, liquid in the container A was added to the container B during stirring and was heated to 70° C. and adjusted the stirring speed to 1600 rpm. After 10 minutes, cooling was started (50° C.) and the stirring speed was reduced (700 rpm). Then, the prepared nano cream C phase (3 g) was added to be uniformly stirred. A white finished product of the nano liniment was obtained. Its particle size was 27.91 nm (by intensity Z-average), and the volume distribution particle size ranged from 19.10 nm (D10) to 45.70 nm (D90). The particle size and its distribution of the febuxostat, allopurinol and 4-hydroxymethyl phenyl-beta-D-glucopyranoside nano liniment sample (low concentration) were shown in FIG. 13.

Embodiment 6B: Preparation of Febuxostat, Allopurinol and 4-hydroxymethyl phenyl-beta-D-glucopyranoside Nano Liniment and Effect of Application (High Concentration with 0.5%, 0.5% and 0.5%)

Figure 14:
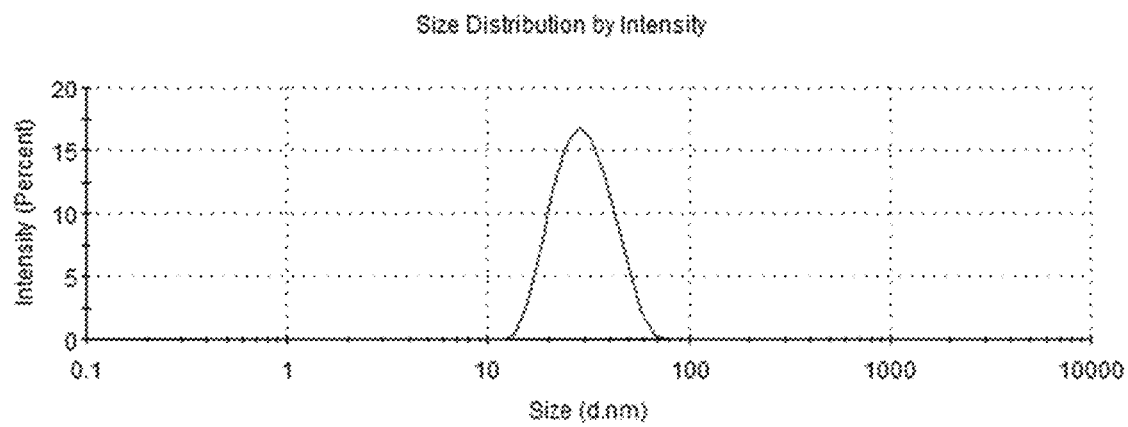
FIG. 14 is a particle size and its distribution diagram of a febuxostat, allopurinol and 4-hydroxymethyl phenyl-beta-D-glucopyranoside nano liniment sample (high concentration).

The preparation steps of the febuxostat, allopurinol and 4-hydroxymethyl phenyl-beta-D-glucopyranoside high-concentration nano liniment were basically the same as the above Embodiment 6A. The total concentration of febuxostat was 0.5% (0.1% in the A phase, 0.4% in the B phase), the total concentration of allopurinol was 0.5% (0.1% in the A phase, 0.4% in the B phase), the total concentration of 4-hydroxymethyl phenyl-beta-D-glucopyranoside was 0.5% (0.1% in the A phase, 0.4% in the B phase), the pH of the B phase was adjusted to 8. and ethanol (5 g) was added. Ultimately, a white finished product of the nano liniment was obtained. Its particle size was 27.94 nm (by intensity Z-average), and the volume distribution particle size ranged from 19.10 nm (D10) to 45.80 nm (D90). The particle size and its distribution of the febuxostat, allopurinol and 4-hydroxymethyl phenyl-beta-D-glucopyranoside nano liniment sample (high concentration) were shown in FIG. 14.

Preliminary Human Trial Results of Preparation (n=5)

Figure 25:
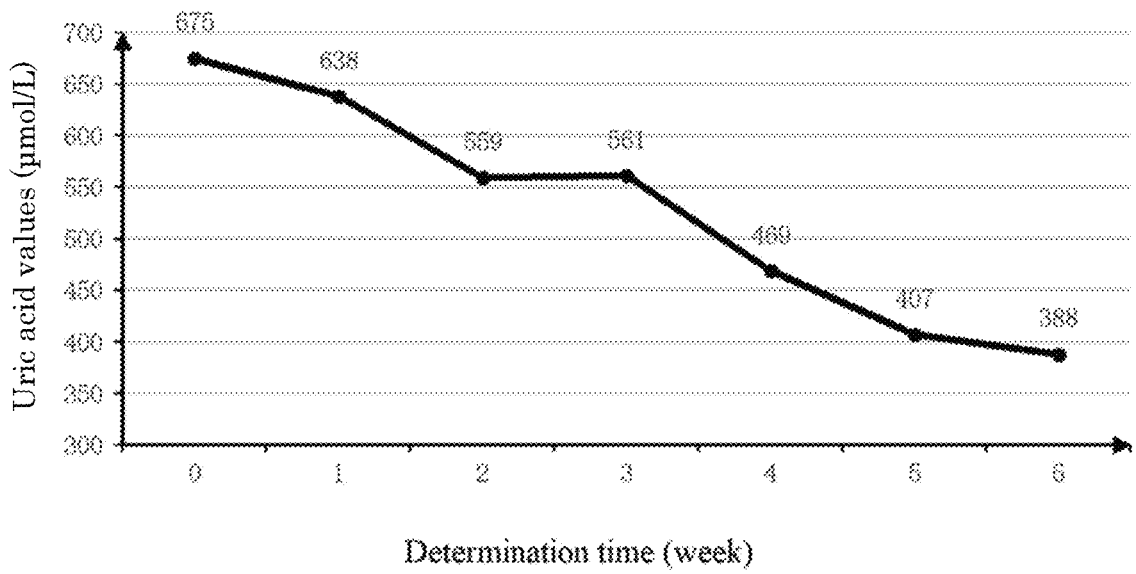
FIG. 25 is a change diagram of uric acid values of Case 6.
Figure 26:
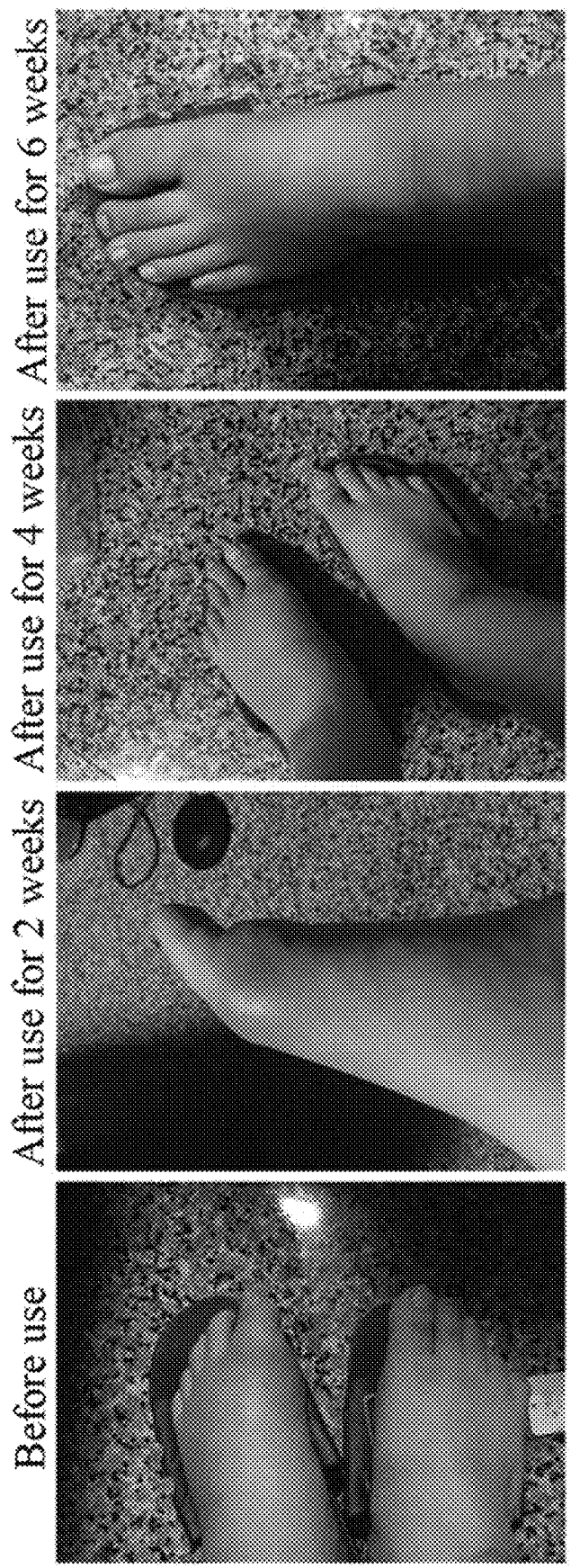
FIG. 26 shows comparative photos of the patient with gout in Case 6 in different periods before and after the medicine is used.

The low-dosage (low-concentration) of febuxostat, allopurinol and 4-hydroxymethyl phenyl-beta-D-glucopyranoside preparation had the obvious effect on crystal dissolution of the gout crystals. The high-dosage (high-concentration) of febuxostat, allopurinol and 4-hydroxymethyl phenyl-beta-D-glucopyranoside preparation had the very obvious effect on crystal dissolution of the gout crystals, and the crystals of all the patients in test objects within the test period from 1 week to 6 weeks were softened and diminished or even completely eliminated. A group of change photos with typical crystal dissolution effects of high dosage were shown in Case 6 (FIG. 26, high dosage). The determination of the blood uric acid values (fasting) of the patients found that the level of uric acid in blood was greatly reduced, and the level of uric acid was decreased with the period of administration (FIG. 25).

In the above embodiments, the cream phase (agent) C phase was prepared in the following steps:

wherein the water phase of the cream phase (g): water (89), dipotassium glycyrrhizinate (0.3), allantoin (0.1), carbomer (0.2), nicotinamide (1), sodium hyaluronate (0.03), methylparaben (0.1), glycerol (3), propylene glycol (3) and butanediol (3);

the oil phase of the cream phase (g): cetostearyl alcohol (2), PEG-100 stearate (0.5), glyceryl stearate (0.5), polydimethylsiloxane (0.5), caprylic capric triglyceride (3), stearic acid (0.2), mineral oil (0.8), propyl hydroxybenzoate (0.4), avocado oil (0.5), jojoba oil (0.5) and evening primrose oil (0.5); and the addition phase (g): triethanolamine (0.2), phenoxyethanol (0.6) and essence (0.1), wherein the preparation steps: the water phase of the cream phase was added to purified water to stir and dissolve and was heated to 80° C.; the oil phase of the cream phase was heated to 80° C. to dissolve; the speed was adjusted to 1500 rpm and the oil phase of the cream phase was slowly added to the water phase to be stirred at high speed for 10 minutes; then the speed was reduced and the temperature was lowered to 40° C.; and than after phenoxyethanol, essence and triethanolamine were added, stirring was stopped.

Stabilities of Preparations

The stabilities of the above nano preparations are respectively tested in the following three common conditions:
1) room temperature (25° C., T=0, 1 month, 3 months, 6 months);
2) high temperature (40° C., T=0, 1 month); and
3) freezing-dissolving circulation (3 times, 3*24 hours).

The results are listed as follows, data determined at each point in time include indices such as particle size, viscosity and appearance characterization (whether delamination and color change occur or not), and the results show that these nano preparations are stable and reliable and do not change basically under experimental conditions. Detailed data are shown in Tables 2-7.

TABLE 2

Stability data of febuxostat nano liniment sample

| Placing condition | Point in time (day) | Low concentration | | | Medium concentration | | | High concentration | | |
|---|---|---|---|---|---|---|---|---|---|---|
| | | Particle size (nm) | Viscosity (mpa · s) | Appearance characterization | Particle size (nm) | Viscosity (mpa · s) | Appearance characterization | Particle size (nm) | Viscosity (mpa · s) | Appearance characterization |
| Room temperature (25° C.) | 0 | 31.33 | 20.2 | √ | 32.18 | 20.4 | √ | 31.41 | 20.3 | √ |
| | 30 | 31.63 | 19.8 | √ | 32.54 | 20.1 | √ | 31.22 | 19.8 | √ |
| | 90 | 31.64 | 19.3 | √ | 32.86 | 19.8 | √ | 31.19 | 19.5 | √ |
| | 180 | 31.80 | 18.8 | √ | 32.85 | 19.5 | √ | 32.32 | 19.4 | √ |
| High temperature (40° C.) | 0 | 31.33 | 20.2 | √ | 32.18 | 20.4 | √ | 31.41 | 20.3 | √ |
| | 30 | 31.80 | 19.2 | √ | 32.59 | 19.2 | √ | 31.67 | 19.6 | √ |
| Times for freezing-dissolving circulation (1 circulation for 48 hours) | 0 | 31.33 | 20.2 | √ | 32.18 | 20.4 | √ | 31.41 | 20.3 | √ |
| | 1 | 31.57 | 20.1 | √ | 32.05 | 20.2 | √ | 31.49 | 20.1 | √ |
| | 2 | 31.64 | 19.9 | √ | 32.76 | 20.1 | √ | 31.50 | 19.7 | √ |
| | 3 | 31.87 | 20.0 | √ | 32.72 | 20.3 | √ | 32.16 | 20.2 | √ |

Note:
The appearance characterization in the table includes whether delamination and color change occur or not, and no delamination and no color change are expressed by the symbol "√", otherwise, by the symbol "x".

TABLE 3

Stability data of 4-hydroxymethyl phenyl-beta-D-glucopyranoside nano liniment sample

| Placing condition | Point in time (day) | Low concentration | | | Medium concentration | | | High concentration | | |
|---|---|---|---|---|---|---|---|---|---|---|
| | | Particle size (nm) | Viscosity (mpa · s) | Appearance characterization | Particle size (nm) | Viscosity (mpa · s) | Appearance characterization | Particle size (nm) | Viscosity (mpa · s) | Appearance characterization |
| Room temperature (25° C.) | 0 | 31.11 | 18.2 | √ | 31.11 | 18.7 | √ | 31.59 | 18.9 | √ |
| | 30 | 31.59 | 17.9 | √ | 31.87 | 18.3 | √ | 30.98 | 18.7 | √ |
| | 90 | 31.17 | 17.6 | √ | 31.81 | 18.1 | √ | 31.00 | 18.5 | √ |
| | 180 | 31.22 | 17.9 | √ | 31.71 | 17.9 | √ | 31.90 | 18.2 | √ |
| High temperature (40° C.) | 0 | 31.11 | 18.2 | √ | 31.11 | 18.7 | √ | 31.59 | 18.9 | √ |
| | 30 | 31.46 | 17.3 | √ | 31.49 | 17.6 | √ | 31.93 | 18.2 | √ |
| Times for freezing- | 0 | 31.11 | 18.2 | √ | 31.11 | 18.7 | √ | 31.59 | 18.9 | √ |
| | 1 | 31.24 | 18.1 | √ | 31.22 | 18.4 | √ | 30.84 | 18.7 | √ |

TABLE 3-continued

Stability data of 4-hydroxymethyl phenyl-beta-D-glucopyranoside nano liniment sample

| Placing condition | Point in time (day) | Low concentration | | | Medium concentration | | | High concentration | | |
|---|---|---|---|---|---|---|---|---|---|---|
| | | Particle size (nm) | Viscosity (mpa · s) | Appearance characterization | Particle size (nm) | Viscosity (mpa · s) | Appearance characterization | Particle size (nm) | Viscosity (mpa · s) | Appearance characterization |
| dissolving circulation (1 circulation for 48 hours) | 2 | 31.28 | 17.9 | √ | 31.40 | 18.3 | √ | 31.90 | 18.6 | √ |
| | 3 | 31.54 | 17.7 | √ | 31.43 | 18.1 | √ | 32.05 | 18.5 | √ |

Note:
The appearance characterization in the table includes whether delamination and color change occur or not, and no delamination and no color change are expressed by the symbol "√", otherwise, by the symbol "x".

TABLE 4

Stability data of allopurinol nano liniment sample

| Placing condition | Time (day) | Low concentration | | | High concentration | | |
|---|---|---|---|---|---|---|---|
| | | Particle size (nm) | Viscosity (mpa · s) | Appearance characterization | Particle size (nm) | Viscosity (mpa · s) | Appearance characterization |
| Room temperature (25° C.) | 0 | 31.07 | 20.8 | √ | 31.11 | 20.7 | √ |
| | 30 | 30.72 | 20.6 | √ | 30.03 | 20.4 | √ |
| | 90 | 31.20 | 20.2 | √ | 31.08 | 20.3 | √ |
| | 180 | 31.21 | 19.9 | √ | 31.20 | 20.1 | √ |
| High temperature (40° C.) | 0 | 31.07 | 20.8 | √ | 31.11 | 20.7 | √ |
| | 30 | 30.48 | 20.1 | √ | 31.09 | 20.1 | √ |
| Times for freezing-dissolving circulation (1 circulation for 48 Hours) | 0 | 31.07 | 20.8 | √ | 31.11 | 20.7 | √ |
| | 1 | 30.87 | 20.6 | √ | 31.03 | 20.6 | √ |
| | 2 | 31.00 | 20.4 | √ | 30.48 | 20.3 | √ |
| | 3 | 31.30 | 20.5 | √ | 30.95 | 20.5 | √ |

Note:
The appearance characterization in the table includes whether delamination and color change occur or not, and no delamination and no color change are expressed by the symbol "√", otherwise, by the symbol "x".

TABLE 5

Stability data of benzbromarone nano liniment sample

| Placing condition | Point in time (day) | Low concentration | | | High concentration | | |
|---|---|---|---|---|---|---|---|
| | | Particle size (nm) | Viscosity (mpa · s) | Appearance characterization | Particle size (nm) | Viscosity (mpa · s) | Appearance characterization |
| Room temperature (25° C.) | 0 | 33.16 | 19.5 | √ | 32.93 | 19.8 | √ |
| | 30 | 33.63 | 19.2 | √ | 32.39 | 19.7 | √ |
| | 90 | 33.69 | 18.9 | √ | 32.96 | 19.4 | √ |
| | 180 | 33.82 | 18.7 | √ | 33.20 | 19.1 | √ |
| High temperature (40° C.) | 0 | 33.16 | 19.5 | √ | 32.93 | 19.8 | √ |
| | 30 | 33.46 | 18.9 | √ | 33.07 | 19.1 | √ |
| Times for freezing-dissolving circulation (1 circulation for 48 Hours) | 0 | 33.16 | 19.5 | √ | 32.93 | 19.8 | √ |
| | 1 | 33.45 | 19.3 | √ | 32.55 | 19.8 | √ |
| | 2 | 33.68 | 19.1 | √ | 32.63 | 19.7 | √ |
| | 3 | 33.76 | 19.1 | √ | 33.90 | 19.5 | √ |

Note:
The appearance characterization in the table includes whether delamination and color change occur or not, and no delamination and no color change are expressed by the symbol "√", otherwise, by the symbol "x".

TABLE 6

Stability data of benzbromarone and allopurinol nano liniment sample

| Placing condition | Point in time (day) | Low concentration ||| High concentration |||
|---|---|---|---|---|---|---|---|
| | | Particle size (nm) | Viscosity (mpa · s) | Appearance characterization | Particle size (nm) | Viscosity (mpa · s) | Appearance characterization |
| Room temperature (25° C.) | 0 | 29.38 | 20.3 | √ | 29.52 | 20.2 | √ |
| | 30 | 29.25 | 20.1 | √ | 29.41 | 19.8 | √ |
| | 90 | 29.24 | 19.8 | √ | 29.96 | 19.5 | √ |
| | 180 | 29.43 | 19.5 | √ | 30.32 | 19.3 | √ |
| High temperature (40° C.) | 0 | 29.38 | 20.3 | √ | 29.52 | 20.2 | √ |
| | 30 | 29.90 | 19.8 | √ | 29.74 | 19.5 | √ |
| Times for freezing-dissolving circulation (1 circulation for 48 Hours) | 0 | 29.38 | 20.3 | √ | 29.52 | 20.2 | √ |
| | 1 | 29.53 | 20.1 | √ | 30.20 | 19.9 | √ |
| | 2 | 30.30 | 19.8 | √ | 30.24 | 19.7 | √ |
| | 3 | 29.98 | 19.7 | √ | 30.27 | 19.8 | √ |

Note:
The appearance characterization in the table includes whether delamination and color change occur or not, and no delamination and no color change are expressed by the symbol "√", otherwise, by the symbol "x".

TABLE 7

Stability data of febuxostat and 4-hydroxymethyl phenyl-beta-D-glucopyranoside and allopurinol nano liniment sample

| Placing condition | Point in time (day) | Low concentration ||| High concentration |||
|---|---|---|---|---|---|---|---|
| | | Particle size (nm) | Viscosity (mpa · s) | Appearance characterization | Particle size (nm) | Viscosity (mpa · s) | Appearance characterization |
| Room temperature (25° C.) | 0 | 27.91 | 19.5 | √ | 27.94 | 19.8 | √ |
| | 30 | 27.24 | 19.3 | √ | 28.22 | 19.6 | √ |
| | 90 | 27.62 | 19.1 | √ | 28.24 | 19.3 | √ |
| | 180 | 28.10 | 18.9 | √ | 28.89 | 19.1 | √ |
| High temperature (40° C.) | 0 | 27.91 | 19.5 | √ | 27.94 | 19.8 | √ |
| | 30 | 27.55 | 18.9 | √ | 28.96 | 19.2 | √ |
| Times for freezing-dissolving circulation (1 circulation for 48 Hours) | 0 | 27.91 | 19.5 | √ | 27.94 | 19.8 | √ |
| | 1 | 27.47 | 19.3 | √ | 28.54 | 19.7 | √ |
| | 2 | 27.30 | 19.1 | √ | 28.58 | 19.8 | √ |
| | 3 | 28.25 | 19.1 | √ | 28.63 | 19.6 | √ |

Note:
The appearance characterization in the table includes whether delamination and color change occur or not, and no delamination and no color change are expressed by the symbol "√", otherwise, by the symbol "x".

Result Analysis and Conclusion

In the research and development process of the preparation, the surfactants and lipids (oil) such as polyoxyethylated castor oil (EL35), polysorbate-20 and polysorbate-80 and medium chain triglyceride (such as Labrafac Lipophile WL 1349) are used in the oil phase (A phase), the experiments in various weight ratios are carried out, and Pemulen TR1, Pemulen TR2 and other emulsifiable pastes are also tested as the cream phase (agent). The results show that the nano liniment prepared by using the system of the disclosure has the effects of small size, uniform and symmetric particle size distribution, stability, safety and reliability under actual use conditions. The nano liniment can eliminate gout crystals, can greatly reduce the level of uric acid in the blood of the whole body, and has an effective treatment effect on the symptoms of gout. The nano liniment has the effect of no need of oral administration, and therefore, there is no damage to the viscera, especially, the stomach, intestine, liver, kidney and other organs. These test results also prove that the systemic administration can also be achieved by locally applying the nano transdermal liniment (or spray, patches and so on) except oral medicine, and the same or even better, faster and safer clinical effects are achieved.

The study finds that the dosage form of the oral medicine is changed into the nano transdermal preparation, the medicine prepared into the dosage form (preparation) of the nano liniment is locally and quickly absorbed through local application, and the medicine molecules can be conveyed and transferred to the blood circulation system of the whole body after being absorbed from the local parts of the human body so as to achieve the clinical effect of systemic administration. The new administration mode of systemic medicine delivery through local administration and absorption can overcome various defects of the existing administration mode for treating local diseases through systemic administration, and especially, great damage to the visceral organs of the human body is caused by systemic oral administration and systemic injection administration. The new administration mode is worthy of great popularization and generalization, is favorable for treating local diseases and chronic diseases and is beneficial to the health and safety of people.

The study further finds for the first time that the 4-hydroxymethyl phenyl-beta-D-glucopyranoside has a good treatment effect on gout, and it has a good analgesic effect and has good treatment effects of relieving meridians, increasing blood microcirculation, reducing the level of uric acid in blood, dissolving gout crystals and eliminating lumps.

Case 1 (Febuxostat, High Dosage)
Gender: male; age: 53 years old; the diameter of a tophus is 3.7 cm before use, after use for 6 weeks, uric acid is obviously reduced (as shown in FIG. 15), and the tophus is completely eliminated (as shown in FIG. 16).

Case 2 (4-hydroxymethyl phenyl-beta-D-glucopyranoside, High Dosage)
Gender: male; age: 48 years old; the diameter of a tophus is 2 cm before use, after use for 6 weeks, uric acid is obviously reduced (as shown in FIG. 17), and the tophus is completely eliminated (as shown in FIG. 18).

Case 3 (Allopurinol, High Dosage)
Gender: male; age: 36 years old; the diameter of a tophus is 3 cm before use, after use for 6 weeks, uric acid is obviously reduced (as shown in FIG. 19), and the tophus is completely eliminated (as shown in FIG. 20).

Case 4 (Benzbromarone, High Dosage)
Gender: male; age: 49 years old; the diameter of a tophus is 3 cm before use, after use for 6 weeks, uric acid is obviously reduced (as shown in FIG. 21), and the tophus is completely eliminated (as shown in FIG. 22).

Case 5 (Benzbromarone and Allopurinol, High Dosage)
Gender: male; age: 30 years old; the diameter of a tophus is 2.8 cm before use, after use for 6 weeks, uric acid is obviously reduced (as shown in FIG. 23), and the tophus is completely eliminated (as shown in FIG. 24).

Case 6 (Febuxostat, Allopurinol and 4-hydroxymethyl phenyl-beta-D-glucopyranoside, High Dosage)
Gender: male; age: 41 years old; the diameter of a tophus is 3.2 cm before use, after use for 6 weeks, uric acid is obviously reduced (as shown in FIG. 25), and the tophus is completely eliminated (as shown in FIG. 26).

The raw materials and equipment used in the disclosure, unless otherwise specified, are the common raw materials and equipment in the art; and the methods used in the disclosure, unless otherwise specified, are the conventional methods in the art.

The above descriptions are only the preferred embodiments of the disclosure, which are not intended to limit the disclosure. Any simple modification, change and equivalent transformation made to the above embodiments according to the technical essence of the disclosure are within the protection scope of the technical solution of the disclosure.

What is claimed is:

1. An external nano liniment for external treatment of gout, comprising:
    a cream phase; and
    nanoparticles, dispersed in the cream phase,
        wherein the nanoparticles are of a coating structure having a water phase, an oil phase and a water phase in sequence from inside to outside,
        active ingredients used for treating the gout are embedded or dispersed in the water phase and/or the oil phase of the nanoparticles,
        a size distribution of the nanoparticles is in a range of 1-200 nm,
        the active ingredients comprise at least one of 4-hydroxymethyl phenylbeta-D-glucopyranoside, febuxostat, allopurinol, benzbromarone, colchicine, topiroxostat, lesinurad, etoricoxib, meloxicam, diclofenac sodium, diclofenac potassium, probenecid, indometacin, loxoprofen, piroxicam, dexketoprofen trometamol, acetohexamide, camphor, borneol and mint, and
        when the active ingredients are a single active ingredient, a content of the active ingredients is 0.1-5% with respect to a total weight of the nano liniment when the nano liniment is externally applied to gout parts twice a day for 1-6 weeks, and when the active ingredients are multiple active ingredients, a sum content of the active ingredients is 0.4-5% with respect to the total weight of the nano liniment, when the nano liniment is externally applied to the gout parts twice a day for 1-6 weeks.

2. The external nano liniment for gout according to claim 1, wherein a single active ingredient of the active ingredients is in a content of 0.01-10% with respect to a total weight of the nano liniment.

3. The external nano liniment for gout according to claim 1, wherein the size distribution of the nanoparticles is in a range of 1-100 nm.

4. The external nano liniment for gout according to claim 3, wherein the size distribution of the nanoparticles is in a range of 1-50 nm.

5. The external nano liniment for gout according to claim 1, wherein the active ingredients are a single active ingredient of febuxostat with a concentration of 0.1-3% with respect to the total weight of the nano liniment, when the nano liniment is externally applied to the gout parts twice a day for 1-6 weeks.

6. The external nano liniment for gout according to claim 1, wherein the active ingredients are a single active ingredient of 4-hydroxymethyl phenyl-beta-D-glucopyranoside with a concentration of 0.1-5% with respect to the total weight of the nano liniment, when the nano liniment is externally applied to the gout parts twice a day for 1-6 weeks.

7. The external nano liniment for gout according to claim 1, wherein the active ingredients are a single active ingredient of allopurinol with a concentration of 0.1-1% with respect to the total weight of the nano liniment, when the nano liniment is externally applied to the gout parts twice a day for 1-6 weeks.

8. The external nano liniment for gout according to claim 1, wherein the active ingredients are a single active ingredient of benzbromarone with a concentration of 0.1-0.8% with respect to the total weight of the nano liniment, when the nano liniment is externally applied to the gout parts twice a day for 1-6 weeks.

9. The external nano liniment for gout according to claim 1, wherein the active ingredients include allopurinol with a concentration of 0.2-0.5% and benzbromarone with a concentration of 0.2-0.5% with respect to the total weight of the nano liniment, when the nano liniment is externally applied to the gout parts twice a day for 1-6 weeks.

10. The external nano liniment for gout according to claim 1, wherein the active ingredients include febuxostat with a concentration of 0.2-0.5%, benzbromarone with a concentration of 0.2-0.5%, and 4-hydroxymethyl phenyl-beta-D-glucopyranoside with a concentration of 0.2-0.5% with respect to the total weight of the nano liniment, when the nano liniment is externally applied to the gout parts twice a day for 1-6 weeks.

\* \* \* \* \*